United States Patent
Isono

(10) Patent No.: US 6,412,881 B1
(45) Date of Patent: Jul. 2, 2002

(54) BRAKING SYSTEM HAVING MASTER CYLINDER PISTON RECEIVING BOOSTER OUTPUT AND REAR CHAMBER FLUID PRESSURE FROM SELECTIVELY ACTIVATED PRESSURE INCREASING DEVICE

(75) Inventor: Hiroshi Isono, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/481,273

(22) Filed: Jan. 11, 2000

(30) Foreign Application Priority Data

| Jan. 11, 1999 | (JP) | ............................................ 11-004241 |
| Apr. 30, 1999 | (JP) | ............................................ 11-123604 |
| Jun. 30, 1999 | (JP) | ............................................ 11-184816 |

(51) Int. Cl.⁷ .................................................. B60T 8/44
(52) U.S. Cl. ..................................... 303/114.1; 188/356
(58) Field of Search ....................... 303/114.1, 114.2, 303/114.3, 113.3; 188/356, 357, 358, 359, 355

(56) References Cited

U.S. PATENT DOCUMENTS

| 4,629,258 | A | * | 12/1986 | Resch et al. .................... 303/92 |
| 4,674,805 | A | * | 6/1987 | Leiber ............................ 303/114 |
| 4,678,243 | A | * | 7/1987 | Leiber ............................ 303/114 |
| 4,728,155 | A | * | 3/1988 | Resch ............................ 303/114 |
| 4,914,917 | A | | 4/1990 | Schonlau |
| 5,044,700 | A | | 9/1991 | Willmann |
| 5,217,281 | A | * | 6/1993 | Fujimoto ....................... 303/9.63 |
| 5,531,509 | A | | 7/1996 | Kellner et al. |
| 5,549,361 | A | | 8/1996 | Sorensen |
| 5,588,718 | A | * | 12/1996 | Winner et al. ............. 303/113.1 |
| 5,709,438 | A | * | 1/1998 | Isakson et al. ............. 303/113.3 |
| 6,039,411 | A | * | 3/2000 | Tozu et al. ................. 303/116.1 |
| 6,053,582 | A | | 4/2000 | Ganzel |
| 6,059,380 | A | * | 5/2000 | Pueschel et al. .......... 303/113.2 |
| 6,065,815 | A | * | 5/2000 | Terazawa et al. .......... 303/116.2 |
| 6,135,577 | A | * | 10/2000 | Ishii ............................ 303/114.1 |
| 6,142,583 | A | * | 11/2000 | Steffes ........................ 303/114.1 |
| 6,196,641 | B1 | * | 3/2001 | Oka et al. .................... 303/114.1 |

FOREIGN PATENT DOCUMENTS

| DE | 003728298 A1 | * | 3/1989 | ............... 303/114.1 |
| GB | 2120333 A | * | 11/1983 | ............... 303/114.1 |
| GB | 218506 A | * | 6/1987 | ............... 303/114.1 |
| GB | 2186335 A | * | 8/1987 | ............... 303/114.1 |
| GB | 2196076 A | * | 4/1988 | ............... 303/114.1 |

* cited by examiner

Primary Examiner—Jack Lavinder
Assistant Examiner—Xuan Lan Nguyen
(74) Attorney, Agent, or Firm—Kenyon & Kenyon

(57) ABSTRACT

Automotive vehicle braking system including a booster for boosting a brake operating force, a master cylinder including a pressurizing piston which is fluid-tightly and slidably received in a housing and which cooperates with the housing to define a front pressurizing chamber and a rear pressurizing chamber on front and rear sides thereof so that the pressurizing piston receives at a rear end thereof an output force of the booster, and is advanced to pressurize a fluid in the front pressurizing chamber, and a brake with a wheel brake cylinder connected to the front pressurizing chamber through a fluid passage and activated by the pressurized fluid in the front pressurizing chamber, for braking the wheel, wherein a pressure increasing device is provided so that it is activated when a predetermined pressure-increase initiating condition is satisfied, to pressurize a fluid in the rear pressurizing chamber, for increasing a pressure of the fluid in the wheel brake cylinder to a value higher than a value before the predetermined pressure-increase initiating condition is satisfied.

11 Claims, 24 Drawing Sheets

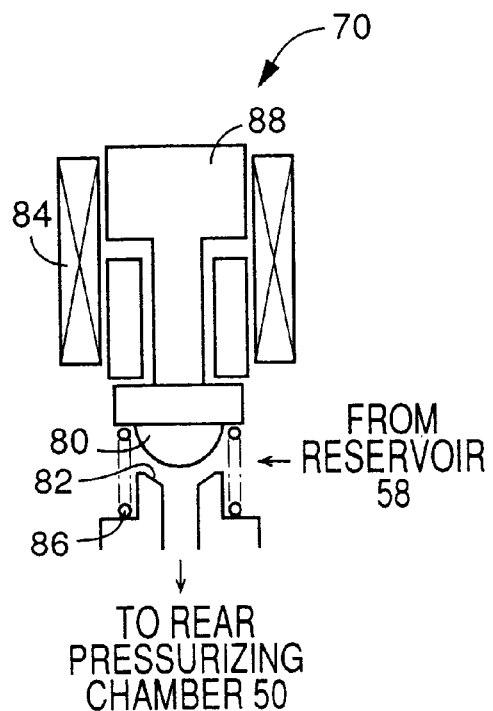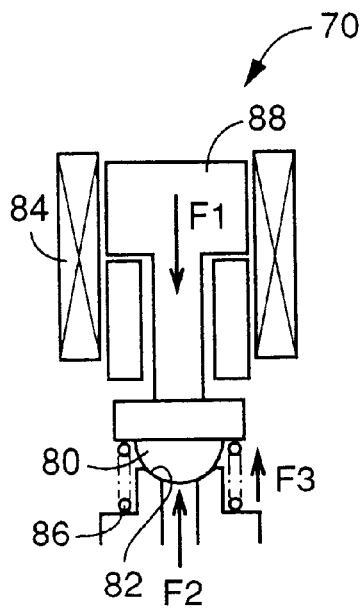
FIG. 2A [WHEN SOLENOID COIL 84 IS OFF]
FIG. 2B [WHEN SOLENOID COIL 84 IS ON]
FIG. 3
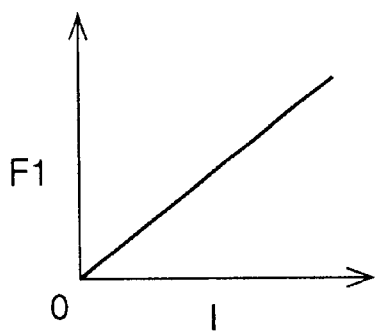

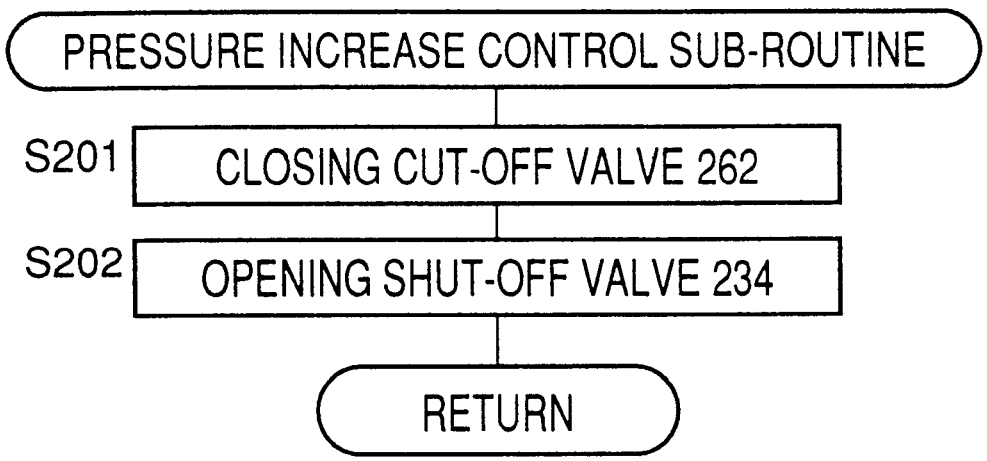
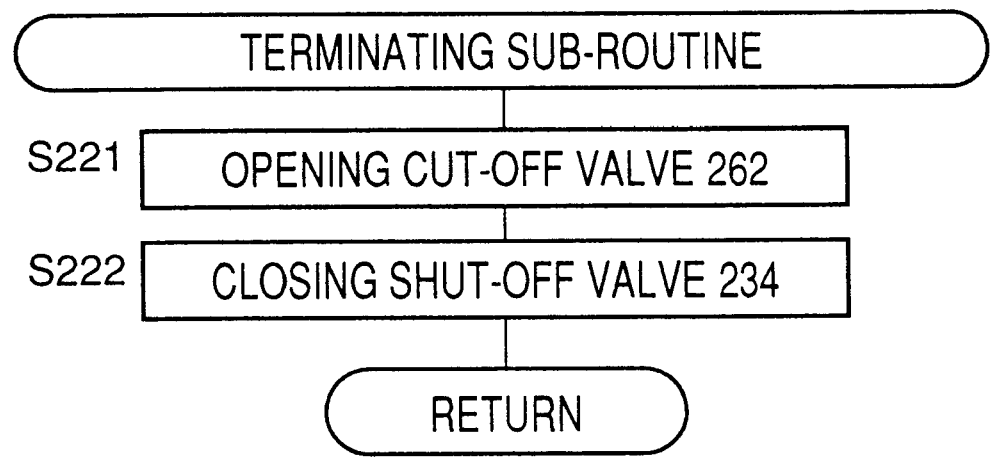

BRAKING SYSTEM HAVING MASTER CYLINDER PISTON RECEIVING BOOSTER OUTPUT AND REAR CHAMBER FLUID PRESSURE FROM SELECTIVELY ACTIVATED PRESSURE INCREASING DEVICE

This application is based on Japanese Patent Applications No. 11-4241 filed Jan. 11, 1999, No. 11-123604 filed Apr. 30, 1999 and No. 11-184816 filed Jun. 30, 1999, the contents of which are incorporated hereinto by reference.

BACKGROUND OF THE INVENTION

1. Field of the Invention

The present invention relates in general to a braking system for an automotive vehicle, and more particularly to a braking system equipped with a booster and a master cylinder.

2. Discussion of the Related Art

JP-A-10-152041 discloses one example of a known braking system of the type indicated above. This braking system includes (a) a brake operating member such as a brake pedal, (b) a booster for boosting an operating force applied to the brake operating member, (c) a master cylinder including a housing, and a pressurizing piston which is substantially fluid-tightly and slidably received in the housing and which has opposite surfaces one of which cooperates with the housing to define a pressurizing chamber in front of said pressurizing piston, the pressurizing piston being advanced by an output force acting on the other of the opposite surfaces thereof, so that a fluid in the pressurizing chamber is pressurized, (d) a brake including a wheel brake cylinder which is connected to the pressurizing chamber of the master cylinder through a fluid passage and which is actuated by the pressurized fluid received from the pressurizing chamber, to apply a brake to a wheel of the vehicle, and (e) a pressure increasing device which is activated, when a predetermined pressure-increase initiating condition is satisfied, for increasing the pressure of the fluid in the wheel brake cylinder.

In this known braking system, the pressure increasing device is disposed in series with the booster, and can be considered to a second booster capable of performing an auxiliary boosting function. In this respect, the pressure increasing device may be designed such that the fluid pressure in the master cylinder is increased at a preset ratio. Where the pressure increasing device is designed according to this design concept, the overall ratio of a braking force produced by the wheel brake cylinder to the brake operating force acting on the brake operating member is expressed by a product of the boosting ratio of the booster and the pressure increasing ratio at which the fluid pressure in the master cylinder is increased by the pressure increasing device.

On the other hand, the operating characteristic or input-output characteristic of the booster tends to vary. This tendency is relatively high where the booster is a vacuum booster which uses a reduced or negative pressure source as a drive power source. The pressure of the negative pressure source available on a motor vehicle is comparatively difficult to accurately control such that the negative pressure is maintained at a predetermined level. For this reason, the operating characteristic of the vacuum booster has a high tendency of change or variation. Further, the operating characteristic of the booster has an influence on the characteristic of change in the fluid pressure in the master cylinder, that is, on the relationship between the brake operating force and the fluid pressure in the master cylinder. Accordingly, a change in the operating characteristic of the booster will result in a variation in the characteristic of change in the fluid pressure in the master cylinder.

Where the pressure increasing device is designed such that the fluid pressure in the master cylinder is increased at a preset ratio, the overall ratio of the braking force produced by the wheel brake cylinder to the brake operating force may deviate from the desired or nominal value to a comparatively large extent, if the characteristic of change in the master cylinder pressure varies with a change in the operating characteristic of the booster. This is because the amount of change in the operating characteristic of the booster is amplified by the predetermined pressure increasing ratio of the pressure increasing device which is connected in series with the booster. Thus, the known braking system has an undesirably high risk of deterioration of the operating feel of the brake operating member due to a change in the operating characteristic of the booster upon activation of the pressure increasing device.

SUMMARY OF THE INVENTION

It is therefore an object of the present invention to provide a vehicle braking system which is less likely to suffer from the deterioration of the operating feel of the brake operating member due to a change in the operating characteristic of the booster upon activation of the pressure increasing device.

The above object may be achieved according to any one of the following modes of the present invention, each of which is numbered like the appended claims and depends from the other mode or modes, where appropriate, so as to indicate and clarify possible combinations of elements or technical features. It is to be understood that the present invention is not limited to the technical features described below, or any combinations of those features.

(1) A braking system for an automotive vehicle having a wheel, comprising: a booster for boosting an operating force acting on a brake operating member; a master cylinder having a housing and including a pressurizing piston which is substantially fluid-tightly and slidably received in the housing and which cooperates with the housing to define a front pressurizing chamber and a rear pressurizing chamber on front and rear sides thereof, the pressurizing piston receiving at a rear end thereof an output force of the booster, a working fluid in the front pressurizing chamber being pressurized by an advancing movement of the pressurizing piston; a fluid passage connected to the front pressurizing chamber of the master cylinder; a brake including a wheel brake cylinder which is connected to the front pressurizing chamber through the fluid passage and which is activated by the fluid pressurized in the front pressurizing chamber, for braking the wheel; and a pressure increasing device activated when a predetermined pressure-increase initiating condition for initiating a pressure increase control is satisfied, to pressurize a fluid in the rear pressurizing chamber, for increasing a pressure of the fluid in the wheel brake cylinder to a value higher than a value before the predetermined pressure-increase initiating condition is satisfied.

In the braking system of the present invention constructed as described above, the pressurizing piston of the master cylinder is adapted to receive both the output force of the booster and a force based on the fluid pressure generated by the pressure increasing device. In the present arrangement, the pressure increasing device and the booster are disposed in parallel with each other, so that a sum of the output force of the booster and the force based on the fluid pressure generated by the pressure increasing device is applied to the wheel brake cylinder. Unlike the conventional braking system, the present braking system is free from a problem that a change in the operating characteristic of the booster is amplified by the pressure increasing device and the amplified change is transferred to the wheel brake cylinder. Thus, the present braking system is less likely to suffer from undesirable deterioration of the operating feel of the brake operating member due to the change in the operating characteristic of the booster.

In the present braking system wherein the electrically controlled pressure increasing device which is primarily controlled electrically and the booster which is primarily controlled mechanically are disposed in parallel with each other, the master cylinder can receive one of the output force of the booster and the force based on the fluid pressure generated by the pressure increasing device, even in the event of a failure of the booster or the pressure increasing device, unless both of the booster and the pressure increasing device simultaneously fail to normally function. Accordingly, the provision of the pressure increasing device provides an improvement in the operating reliability of the braking system, namely, an increased degree of fail-safe stability of the braking system.

The booster used in the present braking system may be a vacuum booster using a negative pressure source as its drive source, or a hydraulic booster using a hydraulic pressure source as its drive source.

The working fluid in the rear pressurizing chamber, which is pressurized by the pressure increasing device, may be either a liquid or a gas.

(2) A braking system according to the above mode (1), wherein the predetermined pressure-increase initiating condition is a predetermined operating condition of the booster in which a braking effect to be provided by the wheel brake cylinder is reduced, and the pressure increasing device is activated, upon detection of the predetermined operating condition, to pressurize the fluid in the rear pressurizing chamber of the master cylinder, so as to at least reduce an amount of reduction of the braking effect.

In the braking system according to the above mode (2), the amount of reduction of the braking effect due to a change of the operating condition of the booster is reduced by an operation of the pressure increasing device to apply a fluid pressure to the rear pressurizing chamber so that the pressurizing piston of the master cylinder receives at its rear end the fluid pressure.

In the present braking system, the predetermined pressure-increase initiating condition may be a condition that the boosting limit of the booster has been reached, so that the pressure increasing device is activated, upon detection that the boosting limit has been reached, to effect a braking effect characteristic control for reducing the amount of reduction of the rate of increase of the braking effect after the boosting limit has been reached. Alternatively, the pressure-increase initiating condition may be a condition that the booster fails to normally function, so that the pressure increasing device is activated, upon detection of a failure of the booster, to effect a pressure increase control for reducing the amount of reduction of the braking effect due to the failure of the booster.

The braking system according to the present invention may be adapted such that the brake indicated above is provided for each of a right wheel and a left wheel of the vehicle, and such that at least one of these two brakes for the right and left wheels is activated upon detection of an undesired yawing moment of the vehicle, so that there is produced a difference between the braking forces produced by the two brakes, for applying a yawing moment to the vehicle so as to offset the undesired yawing moment which would lower the running stability of the vehicle. In this case, the pressure-increase initiating condition may be the generation of the undesired yawing moment of the vehicle. Namely, the pressure increasing device may be activated upon detection of the generation of the undesired yawing moment of the vehicle, to apply one of the two brakes, for example, for increasing the running stability of the vehicle, without an operation of the brake operating member. Alternatively, the pressure-increase initiating condition may be a condition that the rate of operation of the brake operating member is higher than a predetermined upper limit, so that the pressure increasing device is activated when the brake operating member is rapidly operated, for providing an assisting braking force for abrupt brake application to the vehicle.

(3) A braking system according to the above mode (2), wherein the booster is a vacuum booster operated by a negative pressure source, and the predetermined pressure-increase initiating condition is a condition that a boosting limit of the vacuum booster has been reached, the pressure increasing device being activated when the boosting limit has been reached, for at least reducing an amount of reduction of a rate of increase of the braking effect after the boosting limit has been reached.

In the braking system according to the above mode (3), the amount of reduction of the rate of increase of the braking effect after the boosting limit of the vacuum booster has been reached is reduced by an operation of the pressure increasing device to apply a fluid pressure to the rear pressurizing chamber so that the pressurizing piston of the master cylinder receives at its rear end the fluid pressure.

(4) A braking system according to the above mode (3), wherein a pressure of the negative pressure source has a tendency of variation, and the operating force acting on the brake operating member when the boosting limit of the vacuum booster has been reached varies with the pressure of the negative pressure source, the predetermined pressure-increase initiating condition being a condition that the operating force acting on the brake operating member has increased to a boosting-limit brake operating force which is a value of the operating force to be detected when the boosting limit of the vacuum booster has been reached where an actual value of the pressure of the negative pressure source is equal to an upper limit of a variation range in which the actual value is expected to vary, the upper limit being a negative pressure value nearest to the atmospheric pressure.

In the braking system according to the above mode (4), the pressure increasing device is activated to pressurize the fluid in the rear pressurizing chamber, when the operating force of the brake operating member has increased to the boosting-limit brake operating force, which is to be detected when the boosting limit of the vacuum booster has been reached where the actual pressure of the negative pressure source is equal to the upper limit of the expected variation range of the pressure of the negative pressure source. Accordingly, the pressure increasing device is necessarily activated when the boosting limit of the vacuum booster has been reached, irrespective of a variation in the pressure of the negative pressure source.

The present braking system may use a sensor for detecting the actual value of the pressure of the negative pressure source or any related physical quantity which accurately represents the actual pressure value of the negative pressure source, to determine whether the pressure-increase initiating condition has been satisfied or not. Alternatively, the braking system may use a sensor for detecting any other physical quantity other than the actual pressure value and the above-indicated related physical quantity, which any other physical quantity changes with the actual pressure value and is more easily detectable than the above-indicated actual pressure value and related physical quantity. In the former case, the determination as to whether the boosting limit of the vacuum booster has been reached can be made on the basis of the detected actual operating force of the brake operating member as modified by the actually detected pressure of the negative pressure source, so that the determination can be made with comparatively high accuracy, without using the boosting-limit brake operating force as the threshold value of the operating force of the brake operating member which is to be detected when the boosting limit has been reached where the pressure of the negative pressure source is equal to the expected upper limit of the expected variation range. However, the use of the boosting-limit brake operating force as the threshold value is desirable for improved accuracy of the pressure increase control by the pressure increasing device, since there may be some variation in the detecting characteristic of the sensor provided to detect the actual pressure of the negative pressure source or the related physical quantity.

The braking system according to the above mode (4) is based on a fact that the boosting-limit brake operating force varies due to a variation of the actual value of the pressure of the negative pressure source toward and away from the atmospheric pressure, namely, due to a change in the operating characteristic of the vacuum booster due to the variation of the pressure of the negative pressure source. That is, the pressure increasing device is activated to initiate the pressure increase control, when the boosting limit of the vacuum booster has been reached where the pressure of the negative pressure source is equal to the expected highest value nearest to the atmospheric pressure. According to this arrangement, the pressure increasing device is activated before the boosting limit of the vacuum booster has not been actually reached, when the actual pressure of the negative pressure source is lower than the expected upper limit. In this case, the operation of the pressure increasing device to increase the fluid pressure in the wheel brake cylinder is performed while the booster is still normally operating to boost the brake operating force, so that the fluid pressure in the wheel brake cylinder may be higher than the desired value, when the actual pressure of the negative pressure source is lower than the expected upper limit, because the pressure increase control by the pressure increasing device is initiate before the boosting limit of the vacuum booster has been actually reached. However, the present braking system is free from the conventionally encountered problem that the variation of the operating characteristic of the booster due to a variation in the pressure of the negative pressure source is amplified by the pressure increasing device and the amplified variation is transferred to the wheel brake cylinder. Thus, the present braking system solves another problem that the pressure increasing device is not activated even after the boosting limit of the booster has been reached, while avoiding the problem of deteriorated operating feel of the brake operating member due to the wheel brake cylinder pressure which is higher than the desired value due to the variation in the pressure of the negative pressure source, (5) A braking system according to any one of the above modes (1)–(4), wherein the master cylinder includes a second pressurizing piston in addition to the above-indicated pressurizing piston which serves as a first pressurizing piston, the first and second pressurizing pistons being disposed in series with each other in the housing such that the first pressurizing piston cooperates with the housing to define the above-indicated front pressurizing chamber as a first front pressurizing chamber while the second pressurizing piston cooperates with the housing to define a second front pressurizing chamber.

Where the conventional braking system described above is modified such that the master cylinder has two pressurizing pistons which are disposed in series with each other and which which cooperate with the housing to define respective two pressurizing chambers, two pressure increasing devices are provided downstream of the respective two pressurizing chambers to pressurize the fluid in the pressurizing chambers. In this modified conventional braking system, the fluid pressures in the two wheel brake cylinders connected to the two pressurizing chambers are desirably equal to each other, during operations of the two pressure increasing devices. To this end, the two pressure increasing devices are required to be controlled so as to increase the fluid pressures in the two wheel brake cylinders so that the fluid pressures in the two wheel brake cylinders are equal to each other.

In the braking system according to the above mode (5), on the other hand, the fluid pressures in the two front pressurizing chambers of the master cylinder are increased by the same amount by the fluid pressure in the rear pressurizing chamber, which is increased by the single pressure increasing device. Accordingly, the fluid pressures in the two wheel brake cylinders connected to the front pressurizing chambers are increased to the same level. Therefore, the present braking system does not require a special control of the pressure increasing device for equalizing the fluid pressures in the two wheel brake cylinders connected to the respective two front pressurizing chambers. In other words, the pressure increasing device can be comparatively easily controlled for establishing the same fluid pressure in the two wheel brake cylinders.

(6) A braking system according to any one of the above modes (1)–(5), wherein the pressure increasing device comprises (a) a physical quantity sensor for detecting a physical quantity which relates to the operating force acting on the brake operating member, (b) a pressure generating device electrically operated to pressurize the fluid in the rear pressurizing chamber; and (c) a controller for determining a desired value of the fluid pressure to be established in the rear pressurizing chamber, on the basis of the physical quantity detected by the sensor, and according to a predetermined relationship between the physical quantity and the desired value, the controller controlling the pressure generating device such that the fluid pressure in the rear pressurizing chamber is controlled to the desired value.

The physical quantity relating to the operating force of the brake operating member may be a physical quantity detected at a point upstream of the pressure increasing device as viewed in the direction in which the force is transmitted to the pressurizing piston. For instance, the physical quantity relating to the operating force may be the operating force of the brake operating member, or an amount of operation of the brake operating member. However, the physical quantity in question may be a physical quantity detected at a point downstream of the pressure increasing device, such as the fluid pressure in the front pressurizing chamber of the master cylinder, or the fluid pressure in the wheel brake cylinder. For establishing the desired fluid pressure in the wheel brake cylinder by operation of the pressure increasing device, it is desirable that the physical quantity relating to the operating force of the brake operating member be a physical quantity detected at a point upstream of the pressure increasing member, which physical quantity is not influenced by an increase in the fluid pressure in the front pressurizing chamber by the pressure increasing device. However, there exists a predetermined relationship between a physical quantity detected upstream of the pressure increasing device and a physical quantity detected downstream of the pressure increasing device, so that the physical quantity detected downstream of the pressure increasing device may be used to estimate the physical quantity detected upstream of the pressure increasing device.

(7) A braking system according to the above mode (6), wherein the rear pressurizing chamber is filled with a working liquid as the working fluid, and the pressure increasing device further comprises a flow control device having a non-operated state in which the flow control device permits flows of the working liquid into and from the rear pressurizing chamber, and an operated state in which the flow control device inhibits at least a flow of the working liquid from the rear pressurizing chamber.

The volume of the rear pressurizing chamber is increased as the brake operating member is operated in a direction for increasing the operating force. On the other hand, the volume of the rear pressurizing chamber is reduced as the brake operating member is operated in a direction for reducing the operating force. Where the rear pressurizing chamber is filled with a non-compressible working liquid as the working fluid, the flows of the working liquid into and from the rear pressurizing chamber must be permitted during an operation of the brake operating member without an operation of the pressure increasing device, and the flow of the working liquid from the rear pressurizing chamber must be inhibited during an operation of the pressure increasing device.

In the braking system according to the above mode (7) wherein the flows of the liquid into and from the rear pressurizing chamber are permitted when the flow control device is in the non-operated state, and at least the flow of the liquid from the rear pressurizing chamber is inhibited when the flow control device is in the operated state. The flow control device is normally placed in the non-operated state without an electric energy being applied thereto, for permitting the working fluid to flow into and from the rear pressurizing chamber, so that the brake operating member is permitted to be operated in the opposite directions. When the pressure increasing device is activated, the flow control valve is brought into the operated position with an electric energy applied thereto, for inhibiting the working liquid from being discharged from the rear pressurizing chamber, so that the fluid pressure in the rear pressurizing chamber can be increased by the pressure increasing device.

(8) A braking system according to any one of the above modes (1)–(7), wherein the pressure increasing device includes a hydraulic pump whose output is connected to the rear pressurizing chamber, for pressurizing the fluid in the rear pressurizing chamber.

(9) A braking system according to any one of the above modes (1)–(7), wherein the pressure increasing device includes a hydraulic pump whose output is transmitted to the rear pressurizing chamber, without using an accumulator, for pressurizing the fluid in the rear pressurizing chamber.

In the braking system according to the above mode (8), the pressure increasing device does not include an accumulator, for pressurizing the fluid in the rear pressurizing chamber, so that the required size and weight of the pressure increasing device can be reduced.

The hydraulic pump in the braking system according to the above mode (8) may be of a plunger type having a high degree of tightness with respect to the working fluid, or of a gear type whose delivery or output pressure has a relatively small amount of pulsation.

(10) A braking system according to the above mode (8) or (9), wherein the front pressurizing chamber of the master cylinder and the wheel brake cylinder are connected to each other such that the front pressurizing chamber and the wheel brake cylinder are not held disconnected from each other during an operation of the hydraulic pump.

In the braking system according to the above mode (10) wherein the pressure pulsation of the pressurized fluid delivered by the hydraulic pump is transmitted to the pressurizing piston of the master cylinder through the rear pressurizing chamber, the pressure pulsation transmitted to the pressurizing piston is transmitted to the wheel brake cylinder through the front pressurizing chamber and the fluid passage, since the front pressurizing chamber and the wheel brake cylinder are not held disconnected during the operation of the hydraulic pump. Since the wheel brake cylinder provides a damping effect for attenuating or absorbing the pressure pulsation, the amount of transmission of the pressure pulsation of the hydraulic pump to the brake operating member is effectively reduced by the damping effect of the wheel brake cylinder, so as to reduce the deterioration of the operating feel of the brake operating member.

(11) A braking system according to the above mode (10), wherein the fluid passage is provided with a pressure control valve for controlling the fluid pressure in the wheel brake cylinder, the front pressurizing chamber of the master cylinder being connected to the pressure control valve without a cut-off valve being interposed therebetween.

The braking system according to the above mode (11) is a preferred arrangement of the above mode (10).

(12) A braking system according to the above mode (6) or (7), wherein the pressure generating device includes (a) a hydraulic cylinder having a housing, and a control piston substantially fluid-tightly and slidably received in the housing and cooperating with the housing to define a control pressure chamber which is connected to the rear pressurizing chamber and whose fluid pressure is increased by an advancing movement of the control piston, (b) an electric motor, and (c) a motion converting mechanism for converting a rotary motion of the electric motor into a linear motion of the control piston, and wherein the controller controls the electric motor so as to control an operating stroke of the control piston, for thereby regulating a pressure of the fluid in the control pressure chamber.

In the braking system according to the above mode (12), the pressure generating device having a comparatively simple construction is capable of generating a fluid pressure in the rear pressurizing chamber, and regulating this fluid pressure with the electric motor being controlled by the controller.

The motion converting mechanism of the pressure generating device may include an externally threaded member which is supported such that the externally threaded member is axially movable but is not rotatable, and an internally threaded member or a nut which engages the externally threaded member and is supported such that the internally threaded member is rotatable but is not axially movable. In this instance, the internally threaded member is rotated by the electric motor in a selected one of forward or reverse directions, to advance or retract the control piston with the externally threaded member. Alternatively, the externally and internally threaded members may be supported such that the externally supported member is rotatable but is not axially movable and is rotated by the electric motor and such that the internally supported member is not rotatable but is axially movable with the control piston.

(13) A braking system according to the above mode (12), wherein the rear pressurizing chamber is filled with a working liquid as the working fluid, and the pressure increasing device further comprises a reservoir storing the working liquid, and wherein the housing of the hydraulic cylinder of the pressure generating device has a control port connected to the reservoir, the control port being position such that the control port communicates with the control pressure chamber when the control piston is placed in a fully retracted initial position thereof, and does not communicate with the control pressure chamber after the control piston has been advanced a predetermined distance from the initial position.

In the braking system according to the above mode (13), the fluid pressure in the control pressure chamber can be raised by an advancing movement of the control piston during an operation of the pressure increasing device, since the control port connected to the reservoir is closed by the advanced control piston. While the pressure increasing device is not in operation with the control piston placed at its fully retracted initial position, the control port permits fluid communication between the control pressure chamber and the reservoir, and therefore flows of the working liquid therebetween in the opposite directions. Thus, the pressure generating device cooperates with the controller to permit an increase in the liquid pressure in the control pressure chamber to pressurize the liquid in the rear pressurizing chamber of the master cylinder during an operation of the pressure increasing device. In a normal braking operation with an operation of the brake operating member without an operation of the pressure increasing device, on the other hand, the pressure generating device permits the liquid to flow in the opposite directions between the reservoir and the rear pressurizing chamber through the control pressure chamber and the control port, so as to permit a change of the volume of the rear pressurizing chamber depending upon the operation of the brake operating member. The pressure generating device having these two functions contributes to simpler construction of the pressure increasing device as a whole.

(14) A braking system according to any one of the above modes (6)–(13), wherein the rear pressurizing chamber is filled with a working liquid as the working fluid, and the pressure increasing device further comprises (a) a reservoir storing the working liquid, (b) a by-pass passage which by-passes the pressure generating device and which is connected at one of opposite ends thereof to the rear pressurizing chamber and at the other end to the reservoir, and (c) a check valve provided in the by-pass passage and which permits a flow of the liquid in a first direction from the reservoir toward the rear pressurizing chamber, and inhibits a flow of the liquid in a second direction opposite to the first direction.

In the braking system according to the above mode (14), the by-pass passage and the check valve always permit the working liquid to flow from the reservoir into the rear pressurizing chamber of the master cylinder, while by-passing the pressure generating device. In this arrangement, a rapid operation of the brake operating member in a direction for increasing the brake operating force will cause the liquid to be supplied from the reservoir to the rear pressurizing chamber, not only through the pressure generating device, but also through the by-pass passage and the check valve, so as to prevent development of a negative pressure in the rear pressurizing chamber, which would take place due to a low rate of supply flow of the liquid from the reservoir into the rear pressurizing chamber upon a rapid increase of the volume of the rear pressurizing chamber caused by a rapid operation of the brake operating member.

(15) A braking system according to any one of the above modes (6)–(14), wherein the rear pressurizing chamber is filled with a working liquid as the working fluid, and the pressure increasing device further comprises (a) a communication passage connected to opposite ends thereof to the front pressurizing chamber and the rear pressurizing chamber, respectively, (b) a solenoid-operated shut-off valve provided in the communication passage and having an open state for permitting flows of the liquid therethrough and a closed state for inhibiting the flows of the liquid therethrough, and (c) a controller for placing the shut-off valve in the open state when the pressure generating device is not normally operable to pressurize the liquid in the rear pressurizing chamber, and in the closed state when the pressure generating device is normally operable.

In the braking system according to the above mode (15), the liquid in the rear pressurizing chamber can be pressurized by the liquid pressure in the front pressurizing chamber through the communication passage, during an operation of the brake operating member, even in the event of a failure of the pressure generating device, unless the booster is defective.

(16) A braking system according to the above mode (15), wherein the pressure increasing device further comprises a flow control device which inhibits a flow of the liquid in a direction from the front pressurizing chamber toward the rear pressurizing chamber when a pressure of the liquid in the front pressurizing chamber is not higher than a predetermined level, and permits the flow of the liquid in the direction from the front pressurizing chamber toward the rear pressurizing chamber when the pressure in the front pressurizing chamber is higher than the predetermined level.

If the braking system according to the above mode (15) is not provided with the flow control device provided in the braking system according to the above mode (16), and if the shut-off valve provided in the communication passage is opened immediately after a failure of the pressure increasing device is detected after the predetermined pressure-increase initiating condition is satisfied, the liquid pressurized in the front pressurizing chamber by the output force of the booster is delivered not only to the wheel brake cylinder but also to the rear pressurizing chamber immediately after the failure of the pressure increasing device is detected. In this situation, the liquid pressure in the wheel brake cylinder cannot be increased rapidly by the delivery thereto of the pressurized liquid from the rear wheel brake cylinder immediately after the failure of the pressure increasing device is detected, since the shut-off valve is opened immediately after the detection of this failure. This tendency is relatively high where the brake operating member is rapidly operated, resulting in a rapid increase of the brake operating force, which in turn causes the predetermined pressure-increase initiating condition to be satisfied in a short time after the initiation of the operation of the brake operating member.

In the braking system according to the above mode (16) wherein the flow control device is provided, the flow of the liquid from the front pressurizing chamber toward the rear pressurizing chamber is inhibited by the flow control device while the liquid pressure in the front pressurizing chamber is lower than the predetermined level, so that the liquid pressure in the wheel brake cylinder can be rapidly increased. Thus, the operating feel of the brake operating member will not be deteriorated. Further, the flow control device permits the liquid pressure in the rear pressurizing chamber to be increased by the liquid pressure in the front pressurizing chamber after the latter liquid pressure has exceeded the predetermined level.

The flow control device may or may not utilize the shut-off valve provided in the communication passage described above.

(17) A braking system according to the above mode (16), wherein the flow control device includes a first check valve provided in the communication passage, the first check valve inhibiting the flow of the liquid from the front pressurizing chamber toward the rear pressurizing chamber when the pressure of the liquid in the front pressurizing chamber is not higher than the pressure of the liquid in the rear pressurizing chamber by more than a predetermined opening pressure difference which is not substantially zero, the first check valve permitting the flow of the liquid from the front pressurizing chamber toward the rear pressurizing chamber when the pressure of the liquid in the front pressurizing chamber is higher than the pressure of the liquid in the rear pressurizing chamber by more than the predetermined opening pressure difference.

In the braking system according to the above mode (17), the flow control valve has a comparatively simple construction which does not use an electric energy.

(18) A braking system according to the above mode (17), wherein the pressure increasing device further comprises (a) a by-pass passage which by-passes the first check valve, and (b) a second check valve provided in the by-pass passage, the second check valve permitting a flow of the liquid in a first direction from the rear pressurizing chamber toward the front pressurizing chamber and inhibiting a flow of the liquid in a second direction opposite to the first direction, irrespective of a difference between the liquid pressures in the front and rear pressurizing chambers.

In the braking system according to the above mode (18), the liquid can be supplied from a suitable reservoir to the front pressurizing chamber through the second check valve and the communication passage, since the second check valve is provided in the by-pass passage which by-passes the first check valve that inhibits the liquid flow into the front pressurizing chamber. This arrangement is effective to prevent the liquid pressure from being lowered below the atmospheric pressure even when the volume of the front pressurizing chamber is rapidly increased upon rapid releasing of the brake operating member toward its non-operated position.

(19) A braking system according to any one of claims 1–5, wherein the rear pressurizing chamber is filled with a working liquid as the working fluid, and the pressure increasing device comprises (a) a communication passage connected at opposite ends thereof to the front and rear pressurizing chambers, respectively, (b) a solenoid-operated shut-off valve provided in the communication passage, and (c) a controller for controlling the shut-off valve such that the shut-off valve is open while the pressure-increase initiating condition is satisfied, and closed while the pressure-increase initiating condition is not satisfied.

In the braking system according to the above mode (19), the liquid in the rear pressurizing chamber can be pressurized by the liquid pressure in the front pressurizing chamber, which is pressurized by the output force of the booster during an operation of the brake operating member, unless the booster is defective. This arrangement does not require the pressure increasing device to be a pressure generating device independent of the master cylinder, in order for the pressure increasing device to pressurize the liquid in the rear pressurizing chamber.

The feature of the above mode (19) is available in combination of any one of the features of the above modes (16)–(18).

(20) A braking system according to any one of the above modes (1)–(19), wherein the pressure increasing device comprises a vacuum pump which is operated by a negative pressure supplied from a negative pressure source, to pressurized the working fluid in the rear pressurizing chamber.

In the braking system according to the mode (1) described above, the pressure increasing device may include a hydraulic pump which is operated by an electric motor, to pressurize the fluid in the rear pressurizing chamber. The braking system according to the above mode (20) is advantageous over the braking system wherein the pressure increasing device uses a hydraulic pump and an electric motor, in that the braking system according to the above mode (20) does not use an electric motor and that the negative pressure source is usually easily available on an automotive vehicle, without a special mechanism. Namely, the braking system according to the above mode (20) wherein the pressure increasing device uses a vacuum pump is comparatively economical to manufacture, and has reduced weight and operating noise and improved operating reliability.

(21) A braking system according to the above mode (20), wherein the booster is a vacuum booster which is operated by the negative pressure supplied from the negative pressure source.

In the braking system according to the above mode (21), the negative pressure source is used for operating not only the booster in the form of the vacuum booster but also the vacuum pump of the pressure increasing device, whereby the braking system can be made simpler in construction with a reduced number of components.

(22) A braking system according to the above mode (20) or (21), wherein the vacuum pump includes (a) a housing, (b) a plunger slidably received within the housing and cooperating with the housing to define a pump chamber connected to the rear pressurizing chamber, and (c) a diaphragm slidably received within the housing and cooperating with the housing to define a variable-pressure chamber and an atmospheric pressure chamber on opposite sides of the diaphragm, the variable-pressure chamber being selectively exposed to an atmospheric pressure and the negative pressure of the negative pressure source, while the atmospheric pressure chamber being held exposed to the atmospheric pressure, the plunger being moved with the diaphragm depending upon a difference between pressures in the variable-pressure chamber and the atmospheric pressure chamber, so that a volume of the pump chamber changes with a movement of the plunger.

(23) A braking system according to any one of the above modes (20)–(22), wherein the vacuum pump further includes a three-way valve connected to an atmosphere, the negative pressure source and the variable-pressure chamber, the three-way valve having a first state in which the variable-pressure chamber is disconnected from the negative pressure source and is communicated with the atmosphere, and a second state in which the variable-pressure chamber is disconnected from the atmosphere and is communicated with the negative pressure source.

In the braking system according to the above mode (23), the atmospheric pressure and the negative pressure are selectively applied to the variable-pressure chamber of the vacuum pump, through the single three-way valve. Thus, the pressure increasing device does not require two control valves one for applying the atmospheric pressure and the other for applying the negative pressure. Accordingly, the valve arrangement for selectively applying the atmospheric pressure and the negative pressure to the variable-pressure chamber of the vacuum pump can be simplified, so that the vacuum pump as a whole can be simplified in construction.

BRIEF DESCRIPTION OF THE DRAWINGS

The above and optional objects, features, advantages and technical and industrial significance of this invention will become more apparent by reading the following detailed description of presently preferred embodiments of the invention, when considered in connection with the accompanying drawings, in which:

FIGS. 2A and 2B are enlarged cross sectional views of a pressure control valve provided in the braking system of FIG. 1;

FIG. 3 is a graph indicating a relationship between an electric current I applied to a solenoid coil of the pressure control valve of FIGS. 2A and 2B, and an attraction force F1 produced by the solenoid coil;

FIG. 17 is a flow chart illustrating a pressure increase control sub-routine executed by a computer of an electronic control unit shown in FIG. 16;

FIG. 18 is a flow chart illustrating a terminating sub-routine executed by the computer of the electronic control unit shown in FIG. 16;

DETAILED DESCRIPTION OF THE PREFERRED EMBODIMENTS

Figure 1:
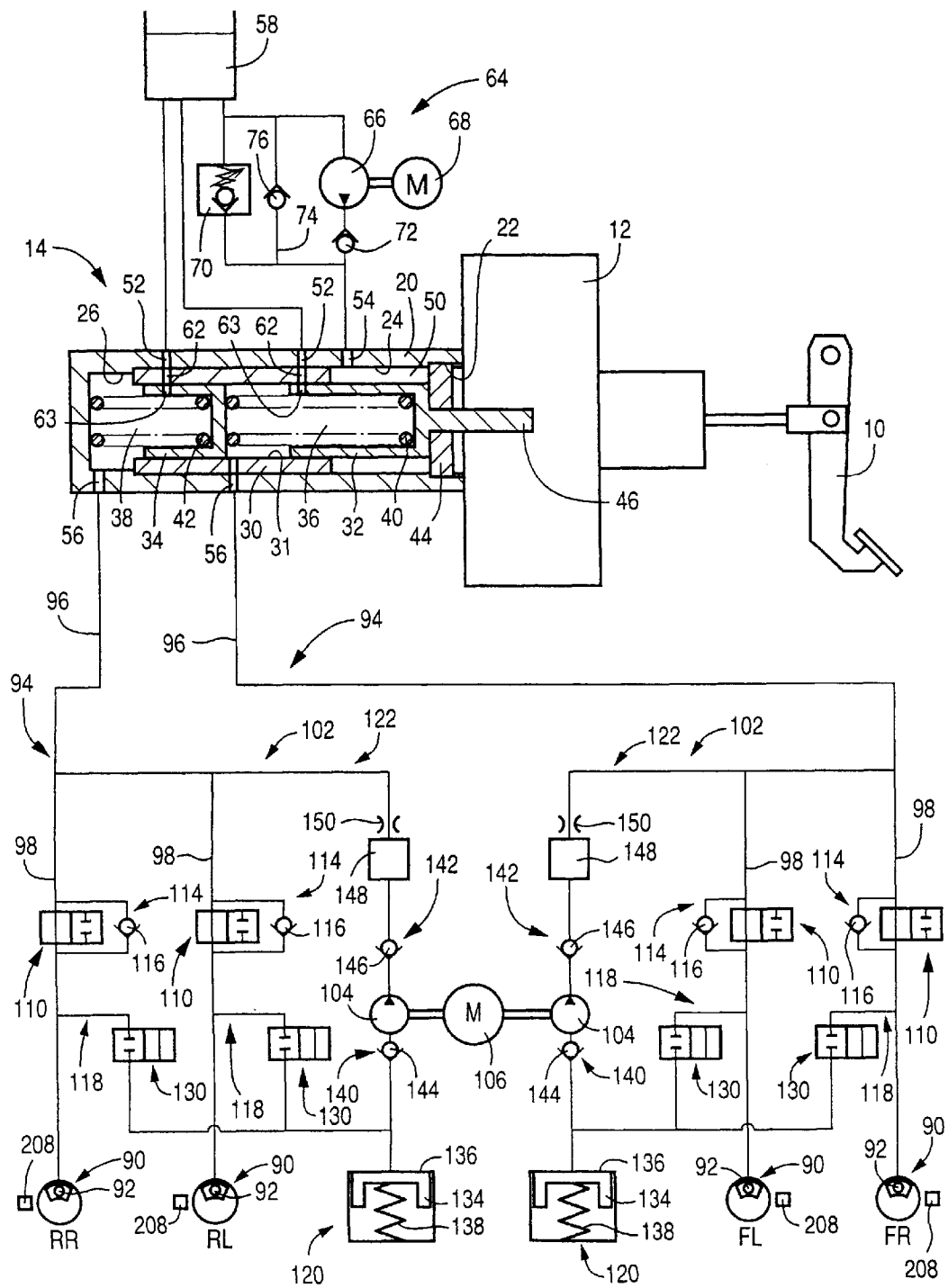
FIG. 1 is a schematic view showing a mechanical arrangement of a braking system constructed according to one embodiment of this invention.

Referring first to FIG. 1, the braking system shown therein is constructed according to the first embodiment of this invention, for use on a 4-wheel automotive vehicle having a left front wheel FL, a right front wheel FR, a left rear wheel RL and a right rear wheel RR. This braking system includes a brake operating member in the form of a brake pedal 10 connected to a tandem-type master cylinder 14 through a vacuum booster 12.

As well known in the art, the booster 12 includes a power piston which partially defines a negative pressure chamber and a variable-pressure chamber on its opposite sides. The negative pressure chamber is connected to an intake manifold of an engine of the vehicle, which serves as a negative pressure source for providing a negative or reduced pressure. The variable-pressure chamber is selectively communicated with the negative pressure chamber and the atmosphere. The power piston is moved by an operating force based on a difference between the pressures in the negative pressure chamber and the variable-pressure chamber, so that a brake operating force in the form of a depression force acting on the brake pedal 10 is boosted, for transmitting the boosted brake operating force to the master cylinder 14. The negative pressure provided by the negative pressure source (pressure in the intake manifold) tends to vary.

The booster 12 is capable of boosting the brake operating force while the pressure in the variable-pressure chamber is being increased toward the atmospheric pressure, from the level equal to the pressure in the negative pressure chamber, as the brake operating force is increased. After the pressure in the variable-pressure chamber has been increased to the atmospheric level, the brake operating force can no longer be boosted by the booster 12. That is, the booster 12 has a boosting limit. The largest value of the boosted brake operating force when the boosting limit has been reached changes with the pressure in the negative pressure chamber, that is, with the pressure of the negative pressure source, such that the largest value increases as the absolute value of the pressure of the negative pressure source is reduced. Namely, the largest value is smaller when the negative pressure of the negative pressure source is closer to the atmospheric pressure.

The master cylinder 14 has a cylindrical housing 20 which is closed at one of its opposite ends and open at the other end. The housing 20 has a first, a second and a third cylindrical bore 22, 24, 26 which are arranged in the order of description in the direction from the open end toward the closed end. The first and third bores 22, 26 have the smallest diameter and the largest diameter, respectively, while the second bore 24 has a diameter intermediate between the diameters of the first and third bores 22, 26.

A sleeve 30 is substantially fluid-tightly fitted in the second cylindrical bore 24, such that the sleeve 30 is held at its end closer to the bottom of the housing 20, in abutting contact with an annular shoulder surface between the second and third cylindrical bores 24, 26, by a suitable fixing member such as a retainer ring, so that the sleeve 30 is prevented from being moved away from the above-indicated shoulder surface. The sleeve 30 has a cylindrical bore 31 in which are fitted a first pressurizing piston 32 and a second pressurizing piston 34 which are arranged in series with each other. Each of these pressurizing pistons 32, 34 is closed at one of its opposite ends and open at the other end, and is substantially fluid-tightly and slidably received in the cylindrical bore 31, such that the inner surface of the bottom wall at the closed end of each pressurizing piston 32, 34 faces toward the bottom wall of the housing 30. The two pressurizing pistons 32, 34 partially define respective front pressurizing chambers 36, 38. Described in more detail, the inner surface of the bottom wall and the inner circumferential surface of each pressurizing piston 32, 34 partially define the corresponding front pressurizing chamber 36, 38. Two biasing members in the form of two springs 40, 42 are disposed within the respective front pressurizing chambers 36, 38, so that the pressurizing pistons 32, 34 are biased toward their fully retracted positions of FIG. 1. The fully retracted position of the first pressurizing piston 32 is determined by a closure member 44 which will be described, while the fully retracted position of the second pressurizing piston 34 is determined by the fully retracted position of the first pressurizing piston 32, and an initial length and an initial load of the spring 40 disposed within the front pressurizing chamber 36 partially defined by the first pressurizing piston 32.

The cylindrical housing 20 is substantially fluid-tightly closed at the open end by the closure member 44 which is fitted in the first cylindrical bore 22 such that the closure member 44 is held in abutting contact with an annular shoulder surface between the first and second cylindrical bores 22, 24. The closure member 44, the axial position of which is determined by the shoulder surface indicated above, is prevented from being removed from the housing 20, by a suitable fixing member such as a retainer ring. As indicated above, the fully retracted position of the first pressurizing piston 32 is determined by abutting contact of its rear end face with the closure member 44. The first pressurizing piston 32 has an auxiliary piston 46 which projects from its rear end face in the rear direction into the booster 12, extending through the closure member 44 substantially fluid-tightly and slidably. The master cylinder 14 is activated with the auxiliary piston 46 receiving the output force of the booster 12 from the power piston, so that masses of a working oil or liquid as a working fluid in the two front pressurizing chambers 36, 38 are pressurized to the same pressure value, on the basis of the output force of the booster 12.

The housing 20 and the closure member 44 fitted in the housing 20 cooperate with the first pressurizing piston 32 to define a rear pressurizing chamber 50. When a fluid pressure is applied to this rear pressurizing chamber 50, the first pressurizing piston 32 is advanced from its fully retracted position, whereby the fluid pressure in the front pressurizing chamber 36 is increased, and as a result, the second pressurizing piston 34 is also advanced from its fully retracted position, so that the fluid pressure in the front pressurizing chamber 38 is also increased.

The housing 20 has two reservoir ports 52, one pressure increasing port 54, and two brake cylinder ports 56.

The two reservoir ports 52 are provided for communication of the two front pressurizing chambers 36, 38 with a reservoir 58 which stores the working fluid at the atmospheric pressure. These two reservoir ports 52 are formed through respective axial portions of the housing 20 which correspond to the respective front pressurizing chambers 36, 38. Each of the reservoir ports 52 is held in communication with a communication passage 62 formed through the cylindrical wall of the sleeve 30 in the radial direction. Each of the pressurizing pistons 32, 34 has a communication passage 63 formed through its cylindrical wall in the radial direction. The communication passages 63 are positioned so that they communicate with the corresponding reservoir ports 52 and communication passages 62, when the pressurizing pistons 32, 34 are located at their fully retracted positions of FIG. 1. When each pressurizing piston 32, 34 is advanced by a small distance from its fully retracted position, the corresponding communication passage 63 is closed by the inner circumferential surface of the cylindrical bore 31 of the sleeve 30, while the corresponding communication passage 62 is closed by the outer circumferential surface of the pressurizing piston 32, 34, whereby the reservoir ports 52 are disconnected from the front pressurizing chambers 36, 38, so that the fluid pressure in these chambers 36, 38 can be raised as the pressurizing pistons 32, 34 are further advanced.

The pressure increasing port 54 is formed through the cylindrical wall of the housing 20, at an axial position of the housing 20 at which the port 54 is always held in communication with the rear pressurizing chamber 50, so that the rear pressurizing chamber 50 is held in communication with a pressure increasing device 64 through the pressure increasing port 54. The pressure increasing device 64 includes a pressure increasing pump 66 of gear type, a pump motor 68 for driving the pump 66, and a pressure control valve 70. The pressure increasing pump 66 is connected on its suction side to the reservoir 58 and on its delivery side to the pressure increasing port 54. The pump 66 pressurizes the fluid received from the reservoir 58, so that the pressurized fluid is delivered from the pump 66 to the rear pressurizing chamber 50. A check valve 72 is provided to prevent a reverse flow of the pressurized fluid in the direction from the rear pressurizing chamber 50 toward the delivery side of the pump 66. The pressure increasing device 64 has a by-pass passage 74 which by-passes the pressure increasing pump 66 and the pressure control valve 70. This by-pass passage 74 is provided with a check valve 76 which permits a flow of the fluid in the direction from the reservoir 58 toward the rear pressurizing chamber 50, but inhibits a reverse flow of the fluid in the opposite direction. The provision of this check valve 76 facilitates filling of the rear pressurizing chamber 50 with the fluid supplied from the reservoir 58 when the volume of the chamber 50 is rapidly increased with a rapid or abrupt depression of the brake pedal 10. Namely, the chamber 50 can be rapidly filled with the fluid supplied thereto from the reservoir 58 through the check valve 76 as well as the pressure control valve 70. Accordingly, the check valve 76 functions to prevent the generation of a negative pressure in the rear pressurizing chamber 50 upon a rapid operation of the brake pedal 10 for abrupt brake application to the vehicle.

Referring to FIGS. 2A and 2B, there is shown in enlargement the pressure control valve 70, which is electromagnetically controlled to regulate the fluid pressure in the rear pressurizing chamber 50. The pressure control valve 70 has a housing, a valve member 80, a valve seat 82 on which the valve member 80 is selectively seated, and a solenoid coil 84 for generating an electromagnetic force for controlling a movement of the valve member 80 relative to the valve seat 82. The valve member 80 cooperates with the valve seat 82 to regulate flows of the fluid between the rear pressurizing chamber 50 and the reservoir 58.

When the solenoid coil 84 of the pressure control valve 70 is off or in a de-energized state, the pressure control valve 70 is placed in the open position with the valve member 80 being held apart from the valve seat 82 by a biasing force of a spring 86, whereby the fluid is permitted to flow in the opposite directions between the rear pressurizing chamber 50 and the reservoir 58. In this state, the fluid flows into and from the rear pressurizing chamber 50 through the pressure control valve 70 are permitted, depending upon whether the volume of the rear pressurizing chamber 50 increases or decreases during an operation of the brake pedal 10. Thus, the pressure control valve 70 is a solenoid-operated shut-off valve which is normally open, that is, open while the pressure control valve 70 is held off. Namely, any special operation of the pressure control valve 70 is necessary to permit the volumetric change of the rear pressurizing chamber 50.

When the solenoid coil 84 is on or in an energized state, an armature 88 disposed within the winding of the solenoid coil 84 and carrying the valve member 80 is moved toward the valve seat 82 by an electromagnetic force produced by the solenoid coil 84, so that the valve member 80 is seated onto the valve seat 82, whereby the pressure control valve 70 is closed. At this time, an attraction force F1 based on the electromagnetic force of the solenoid coil 84 acts on the valve member 80 in the direction from the valve member 80 toward the valve seat 82, while a sum of a force F2 based on the fluid pressure in the rear pressurizing chamber 50 and a biasing force F3 of the spring 88 acts on the valve member 80 in the opposite direction. The force F2 is a product of the fluid pressure in the chamber 50 and an effective pressure-receiving surface area of the valve member 80 which receives the fluid pressure in the chamber 50.

When a formula $F2 \leq F1-F3$ is satisfied when the solenoid coil 84 is on or in the energized state while the delivery pressure of the pressure increasing pump 70 is relatively low, namely, while the fluid pressure in the rear pressurizing chamber 50 is relatively low, the valve member 80 is still held seated on the valve seat 82, inhibiting the fluid from flowing from the pump 66 into the reservoir 58, and permitting an increase of the fluid pressure in the rear pressurizing chamber 50 with an increase in the delivery pressure of the pump 66. When an inequity $F2>F1-F2$ is satisfied as a result of a further increase in the fluid pressure in the chamber 50, the valve member 80 is moved away from the valve seat 82, permitting the fluid to flow from the pump 66 into the reservoir 58, whereby a further increase in the fluid pressure in the chamber 50 is prevented. Thus, the fluid pressure in the rear pressurizing chamber 50 is linearly increased with an increase in the attraction force F1 produced by the solenoid coil 84, if the biasing force F3 of the spring 88 is ignored.

The pressure control valve 70 is designed such that the attraction force F1 produced by the solenoid coil 84 linearly increases with an electric current I applied to the solenoid coil 84, as indicated in the graph of FIG. 3.

Referring back to FIG. 1, the two brake cylinder ports 56 are formed through the cylindrical wall of the housing 20, at respective axial positions at which the ports 56 are always held in communication with the respective front pressurizing chambers 36, 38, so that the chambers 36, 38 are connected to two mutually independent pressure application sub-systems of the braking system. Described more specifically, the braking system includes a front brake application sub-system including two front brakes 90 having respective two front wheel brake cylinders 92 for braking the respective left and right front wheels FL, FR, and a rear brake application sub-system including two rear brakes 90 having respective two rear wheel brake cylinders 92 for braking the respective left and right rear wheels RL, RR. Since these two brake application sub-systems are identical in construction with each other, only the front brake application sub-system will be described. It is to be understood that the description of the front brake application sub-system substantially applies to the rear brake application sub-system.

The front pressurizing chamber 36 of the master cylinder 14 is connected through a main fluid passage 94 to the front wheel brake cylinders 92 for the left and right front wheels FL, FR. The main fluid passage 94 includes a common passage 96 extending from the front pressurizing chamber 36, and two branch passages 98 each of which is connected at one end thereof to the common passage 96 and at the other end to the front wheel brake cylinder 92. A pump passage 102 is connected at one end thereof to the common passage 96, in parallel connection with the branch passages 98. This pump passage 102 is connected to an anti-lock pressure control pump 104. A single pump motor 106 is provided for driving the two anti-lock pressure control pumps 104 in the front and rear brake application sub-systems.

Each of the two branch passages 98 is provided with a pressure holding valve 110 which is a normally open solenoid-operated shut-off valve. When a solenoid coil 112 (FIG. 4) of the valve 110 is energized, the valve 110 is brought to a closed state, inhibiting the flow of the fluid in the direction from the anti-lock pressure control pump 104 toward the wheel brake cylinder 92, SO that the fluid pressure in the wheel brake cylinder 92 can be held at the present level. A by-pass passage 114 is connected to each branch passage 98, so as to by-pass the pressure holding valve 110. The by-pass passage 114 is provided with a check valve 116 which permits a flow of the fluid in the direction from the wheel brake cylinder 92 toward the point of connection of the branch passage 98 to the common passage 96 and the pump passage 122, and inhibits the flow in the reverse direction.

A reservoir passage 118 is connected at one end thereof to a portion of each branch passage 98 between the pressure holding valve 110 and the wheel brake cylinder 92, and at the other end to a reservoir 120. The reservoir passage 118 is provided with a pressure reducing valve 130 which is a normally closed solenoid-operated shut-off valve. When a solenoid coil 132 (FIG. 4) of the pressure reducing valve 130 is energized, the valve 130 is brought to an open state, permitting the flow of the fluid from the wheel brake cylinder 92 into the reservoir 120, so that the fluid pressure in the wheel brake cylinder 92 is lowered or reduced.

The reservoir 120 has a housing and a piston 134 which is substantially fluid-tightly and slidably received within the housing and which cooperates with the housing to define a reservoir chamber 136. The reservoir 120 further has biasing means in the form of a spring 138 for biasing the piston 136 in a direction that reduces the volume of the reservoir chamber 136, so that the fluid is stored in the reservoir chamber 136 under pressure. The reservoir chamber 136 is connected to the main fluid passage 94 through the pump passage 102.

The pump passage 102 is divided by the anti-lock pressure control pump 104 into a suction passage 140 on the side of the reservoir 120 and a delivery passage 142 on the side of the points of connection of the branch passages 98 to the common passage 96. The suction and delivery passages 140, 142 are provided with a suction valve 144 and a delivery valve 146, respectively. The delivery passage 142 is further provided with a damper chamber 148 and a flow restrictor in the form of an orifice 150, which are connected in series with each other. These damper chamber 148 and orifice 150 function to reduce a pressure pulsation of the fluid pressurized by the anti-lock pressure control pump 104.

While the mechanical arrangement of the present braking system has been described, an electric arrangement of the braking system will then be described.

Figure 4:
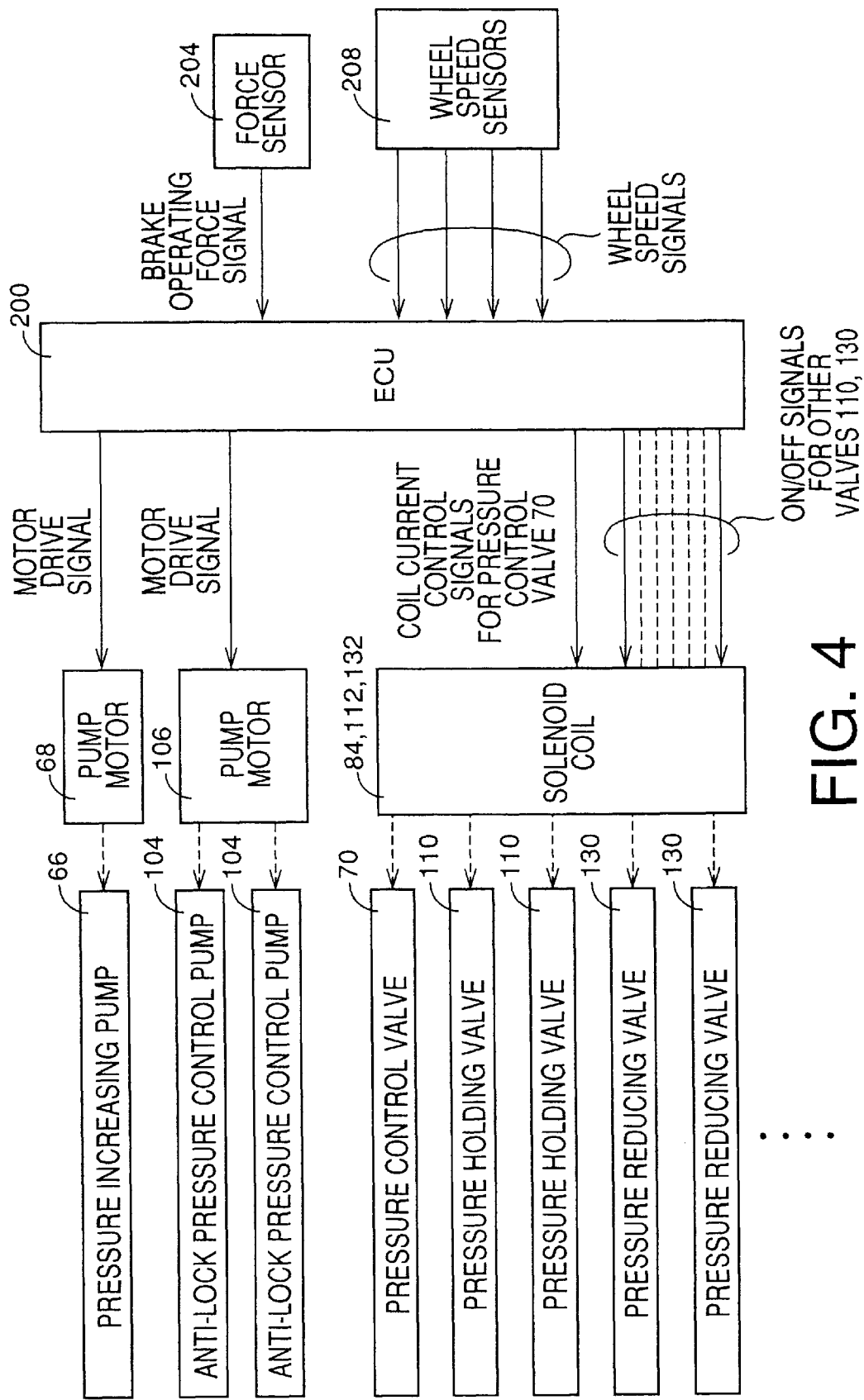
FIG. 4 is a block diagram illustrating an electrical arrangement of the braking system.

As shown in the block diagram of FIG. 4, the present braking system uses an electronic control unit 200 (hereinafter abbreviated as "ECU 200"). This ECU 200, which is an element of the pressure increasing device 60, is principally constituted by a computer incorporating a central processing unit (CPU), a read-only memory (ROM) and a random-access memory (RAM). The ROM stores a program for executing a braking effect characteristic control routine illustrated in the flow chart of FIG. 6, and a program for executing an anti-lock braking pressure control routine. Namely, those programs are executed by the CPU while utilizing a temporary data storage function of the RAM. The braking effect characteristic control routine is executed to control a braking effect characteristic of the braking system such that a deceleration value G of the vehicle attained by the braking system increases linearly, that is, at a constant rate, with a brake operating force F acting on the brake pedal 10, both before and after the boosting limit of the booster 12 has been reached. The term "braking effect characteristic" means a relationship between the brake operating force F and the vehicle deceleration value G. the anti-lock braking pressure control routine is executed to control the braking pressure for each wheel FL, FR, RL, RR, that is, the fluid pressure in each wheel brake cylinder 92, so as to prevent an excessive locking tendency of the wheel during brake application to the vehicle, as well known in the art. In the present embodiment, the working fluid is recirculated through the hydraulic circuit of the braking system, by the anti-lock pressure control pump 104 while the anti-lock pressure control is effected.

To the input portion of the ECU 200, there are connected a brake operating force sensor 204 and four wheel speed sensors 208. The force sensor 204 generates a brake operating force signal indicative of the brake operating force F, while each wheel speed sensor 208 generates a wheel speed signal indicative of the rotating speed of the corresponding wheel.

To the output portion of the ECU 200, there are connected: the solenoid coils 84 of the pressure control valve 70; the pump motor 68 for driving the pressure increasing pump 66; the pump motor 106 for driving each of the anti-lock pressure control pumps 104 of each of the front and rear pressure application sub-systems; the solenoid coil 112 of the pressure holding valve 110 in each pressure application sub-system; and the solenoid coil 132 of the pressure reducing valve 130 in each pressure application sub-system.

The braking effect characteristic control routine will be described by reference to the flow chart of FIG. 5.

This routine is repeatedly executed after the ignition switch of the vehicle is turned on by the vehicle operator. Each cycle of execution of the routine is initiated with step S1 to detect the brake operating force F. Described in detail, the brake operating force signal generated by the brake operating force sensor 204 is read in, and the present brake operating force F acting on the brake pedal 10 is calculated based on the brake operating force signal.

Then, the control flow goes to step S2 to determine whether a predetermined pressure-increase initiating condition for initiating a pressure increase control by the pressure increasing device 64 has been satisfied. Described more specification, step S2 is provided to determine whether the detected brake operating force F has become larger than a predetermined threshold $F_{TH}$, that is, whether the boosting limit of the booster 12 has been reached, namely, whether it is necessary to increase the fluid pressure $P_B$ in the wheel brake cylinders 92 by operation of the pressure increasing pump 66 of the pressure increasing device 64. If an affirmative decision (YES) is obtained in step S2, the control flow goes to step S3 in which a pressure increase control sub-routine is executed. In the present embodiment, the threshold $F_{TH}$ is a boosting-limit brake operating force which is a value of the brake operating force F to be detected when the boosting limit of the booster 12 has been reached where the actual pressure of the negative pressure source (pressure in the intake manifold of the engine) is equal to an upper limit of a fluctuation or variation range in which that actual pressure is expected to vary. The upper limit is the negative pressure value which is nearest to the atmospheric pressure.

Figure 6:
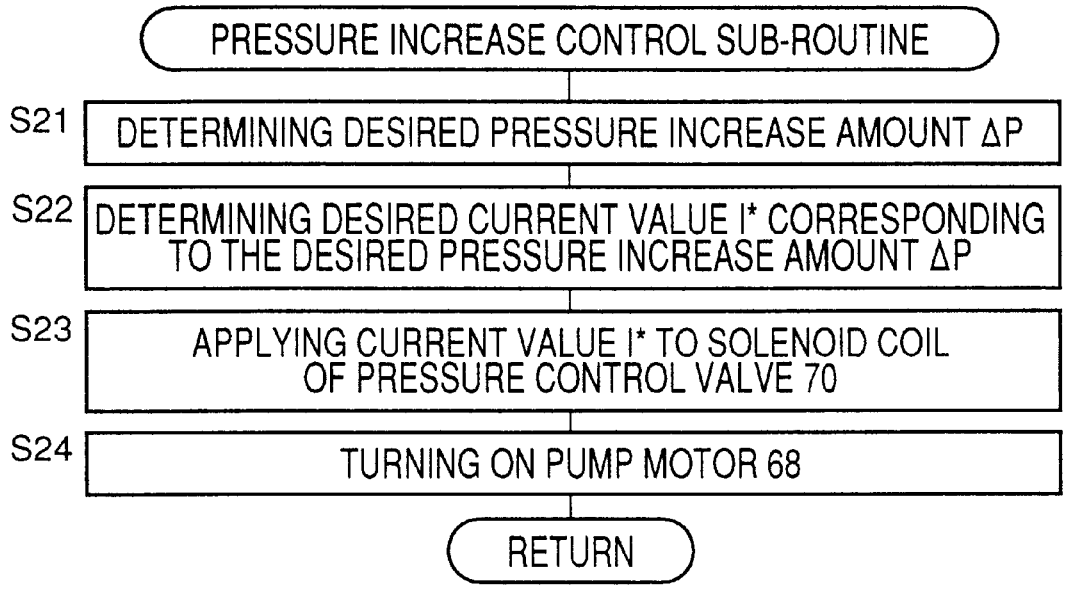
FIG. 6 is a flow chart illustrating a pressure increase control sub-routine executed in step S3 of the routine of FIG. 5.
Figure 7:
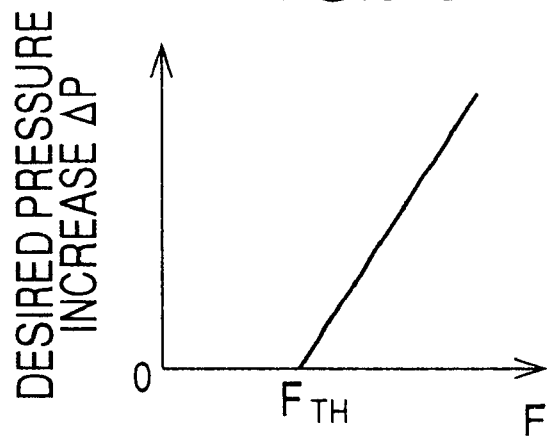
FIG. 7 is a graph indicating a relationship between a brake operating force F and a desired amount ΔP of pressure increase according to the pressure increase control sub-routine of FIG. 6.

The pressure increase control sub-routine is illustrated in the flow chart of FIG. 6. This routine is initiated with step S21 to determine a desired amount ΔP of increase of the fluid pressure in the rear pressurizing chamber 50, on the basis of the detected brake operating force F, and according to a predetermined relationship between the brake operating force F and the desired pressure increase amount ΔP. Data representative of this predetermined F-ΔP relationship are stored in the ROM of the ECU 200. An example of this relationship is shown in the graph of FIG. 7. The F-ΔP relationship is predetermined so that the fluid pressure $P_M$ in the master cylinder 14 increases with the brake operating force F so that the rate of increase of the deceleration value G of the vehicle (which changes substantially in proportion to the wheel brake cylinder pressure $P_B$) with the brake operating force F after the boosting limit of the booster 12 has been reached is equal to that before the boosting limit has been reached. Namely, the desired pressure increase amount ΔP by which the master cylinder pressure $P_M$ and the wheel brake cylinder pressure $P_B$ are to be increased is determined so that even after the boosting limit of the booster 12 has been reached, the wheel brake cylinder pressure $P_B$ increases with the brake operating force F, at the rate before the boosting limit has been reached.

Figure 8:
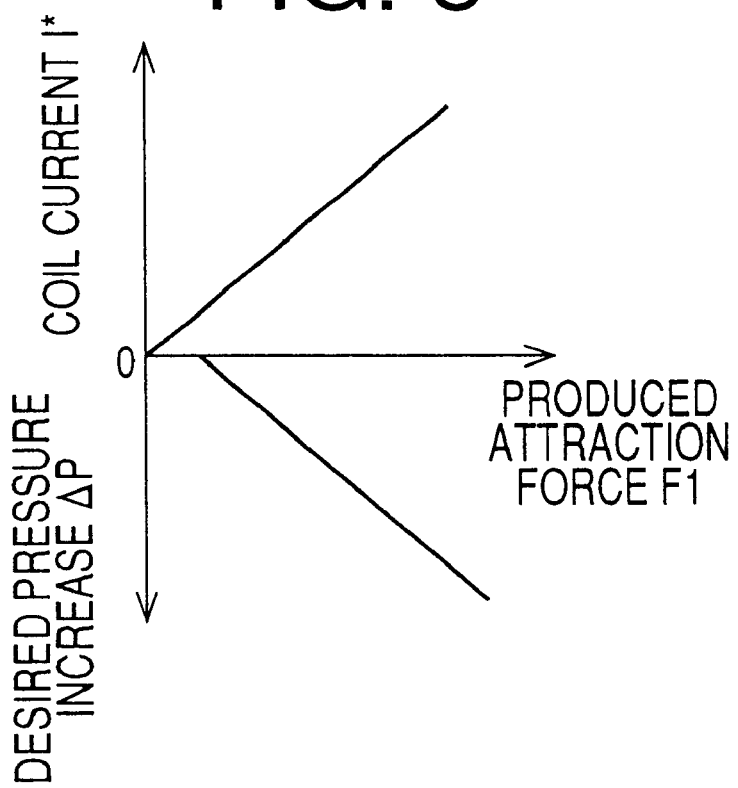
FIG. 8 is a graph indicating relationships between the attraction force F1 produced by the solenoid coil of the pressure control valve and the desired pressure increase amount ΔP and the electric current I to be applied to the coil, according to the pressure increase control sub-routine of FIG. 6.

Step S21 is followed by step S22 to determine a desired value I* of an electric current I to be applied to the solenoid coil 84 of the pressure control valve 70, such that the desired current value I* permits an increase of the wheel brake cylinder pressure $P_B$ by the desired amount ΔP. That is, the desired current value I* is determined on the basis of the determined desired pressure increase amount ΔP and according to a predetermined relationship between the desired pressure increase amount ΔP and the desired current value I*. Data representative of this predetermined ΔP-I* relationship are stored in the ROM of the ECU 200. The graph of FIG. 8 indicates an example of a relationship between the attraction force F1 produced by the solenoid coil 84 and the desired pressure increase amount ΔP, and an example of a relationship between the attraction force F1 and the desired current value I*. The ΔP-I* relationship is represented by these two relationships. To determine the desired current value I*, the desired attraction force F1 is initially determined on the basis of the desired pressure increase amount ΔP, and the desired current value I* is then determined on the basis of the desired attraction force F1.

Then, the control flow goes to step S23 to apply the electric current I having the determined desired value I* to the solenoid coil 84 of the pressure control valve 70. Step S23 is followed by step S24 to generate a signal for turning on the pump motor 68. As a result of operation of the pressure increasing pump 66 by the pump motor 68, the fluid pressure in the rear pressurizing chamber 50 is increased, and the first pressurizing piston 32 is advanced to increase the master cylinder pressure $P_M$ and the fluid pressure $P_B$ in each of the four wheel brake cylinders 92 by the desired pressure increase amount ΔP. Thus, one cycle of execution of the pressure increase control sub-routine of FIG. 6 is terminated, and one cycle of execution of the braking effect characteristic control routine of FIG. 5 is also terminated.

If the detected brake operating force F is not larger than the threshold $F_{TH}$, this means that the boosting limit of the booster 12 has not been reached. In this case, the control flow goes to step S4 in which a terminating sub-routine is executed.

Figure 9:
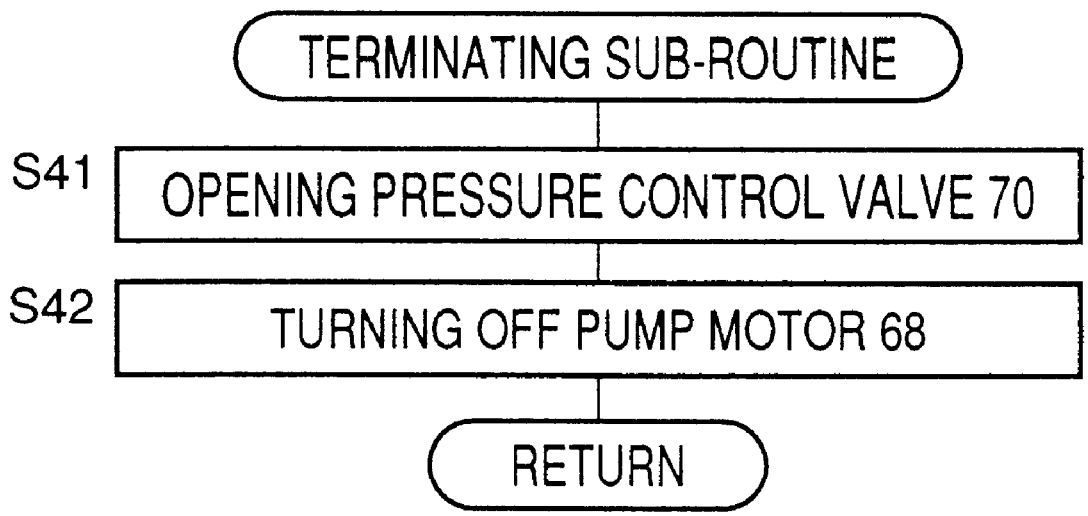
FIG. 9 is a flow chart illustrating a terminating sub-routine executed in step S4 of the routine of FIG. 5.

The terminating sub-routine is illustrated in the flow chart of FIG. 9. This sub-routine is initiated with step S41 to generate a signal for de-energizing the solenoid coil 84 of the pressure control valve 70, so that the pressure control valve 70 is restored to its original open state. Then, step S42 is implemented to generate a signal for turning off the pump motor 68, to thereby terminate the operation of the pressure increasing pump 66 for increasing the master cylinder pressure $P_M$. Thus, one cycle of execution of the terminating sub-routine is terminated, and one cycle of execution of the braking effect characteristic control routine is also terminated.

Figure 5:
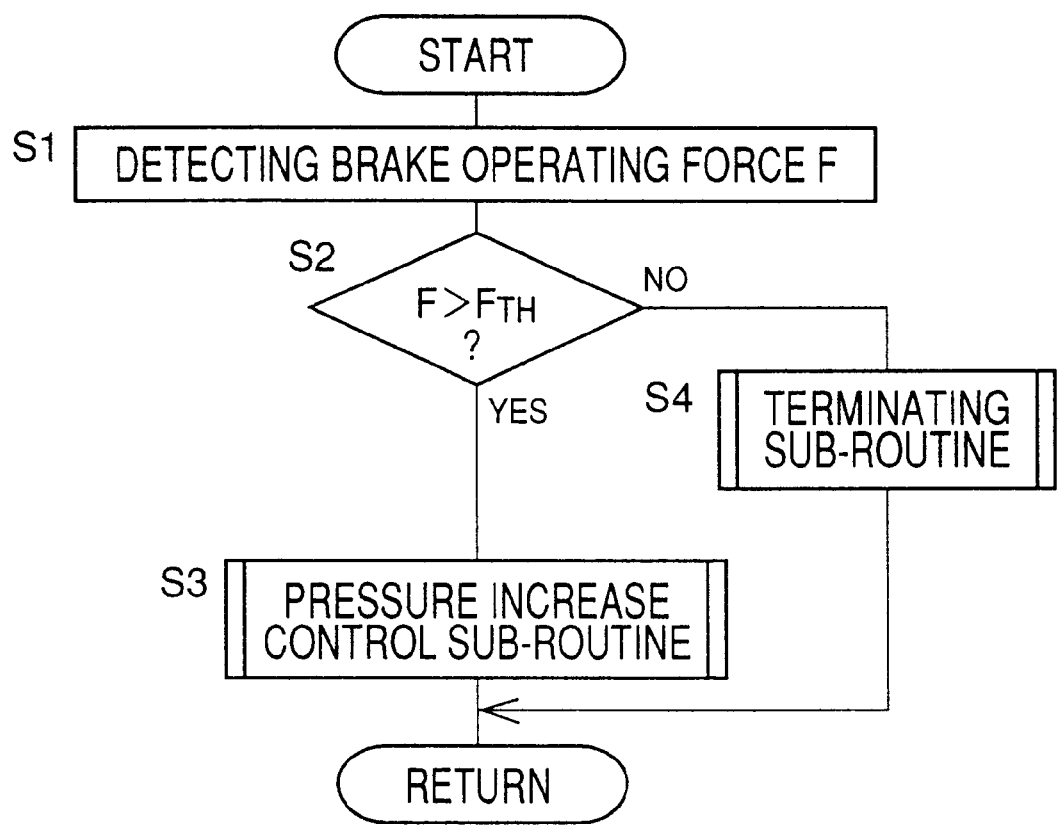
FIG. 5 is a flow chart illustrating a braking effect characteristic control routine executed by a computer of an electronic control unit shown in FIG. 4.
Figure 10:
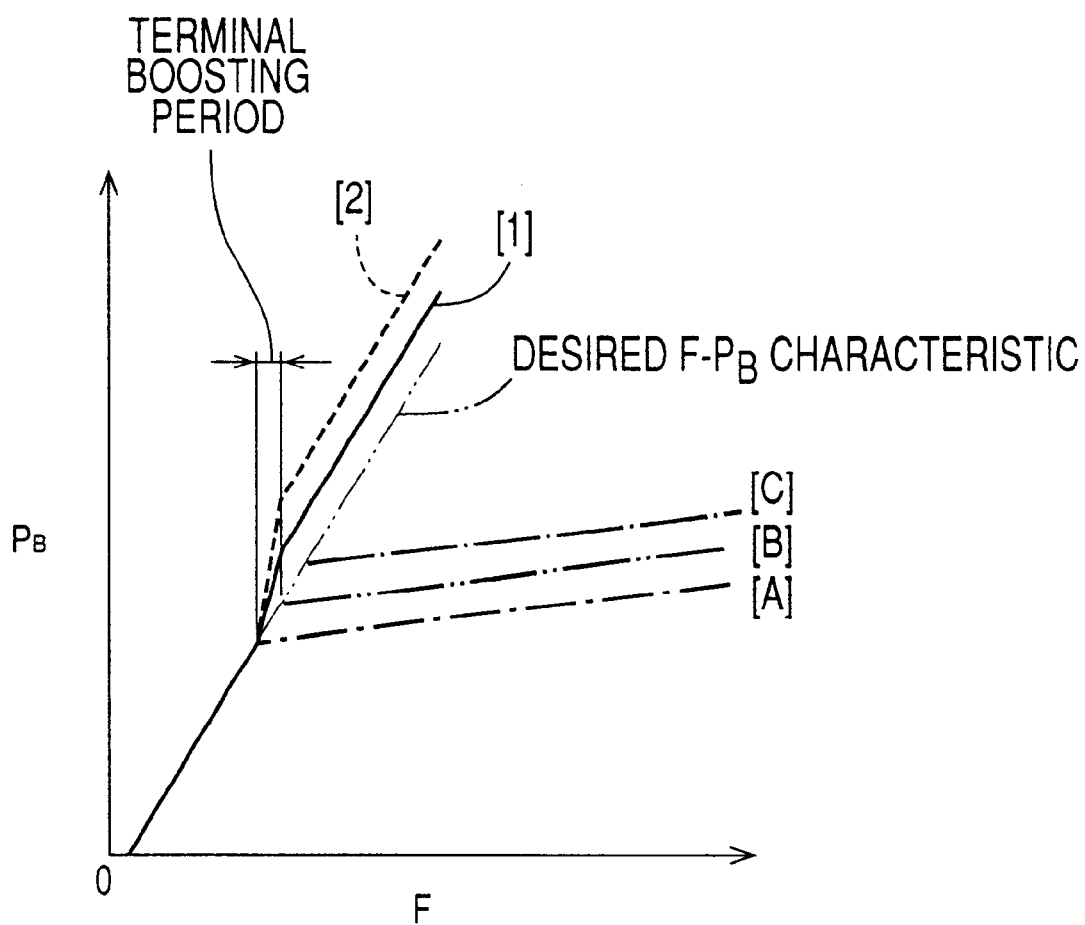
FIG. 10 is a graph showing an effect provided by the braking effect characteristic control routine of FIG. 5.
Figure 11:
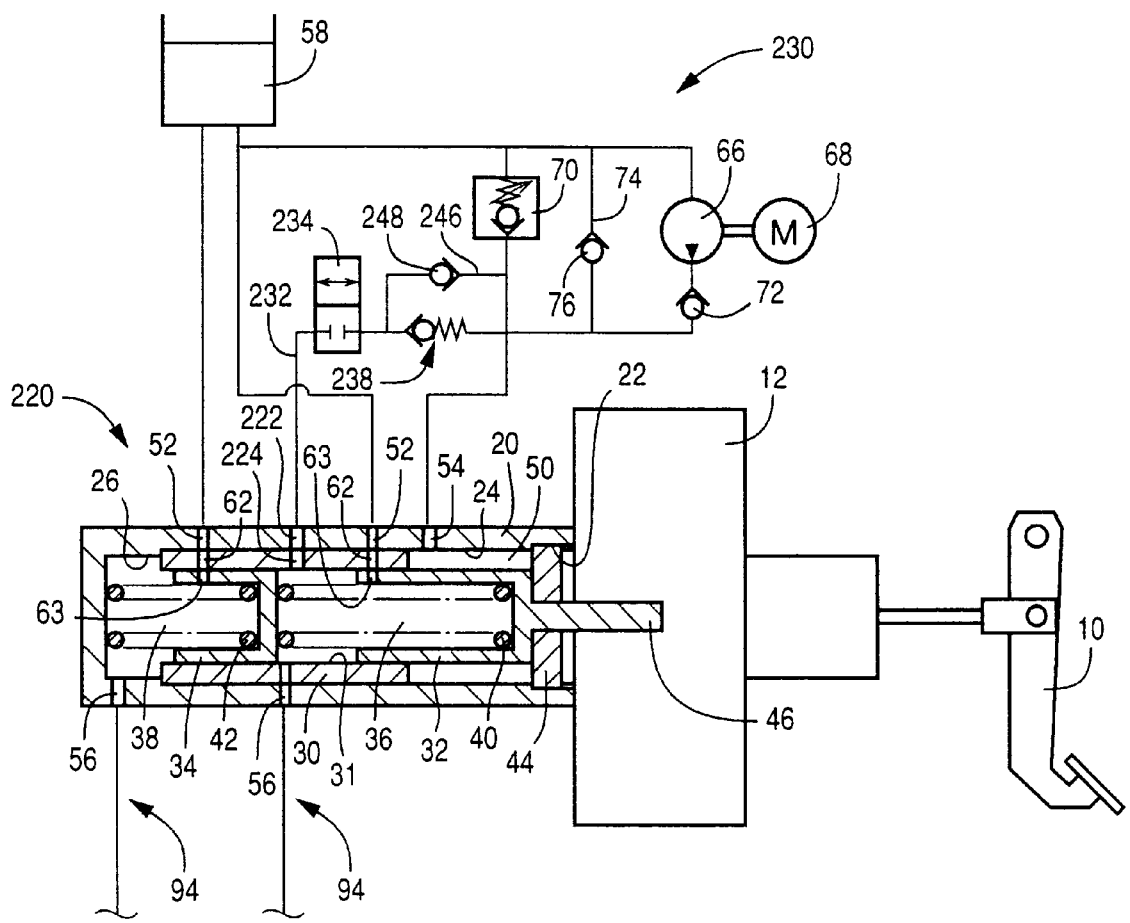
FIG. 11 is a schematic view showing a mechanical arrangement of a braking system constructed according to a second embodiment of the present invention.
Figure 12:
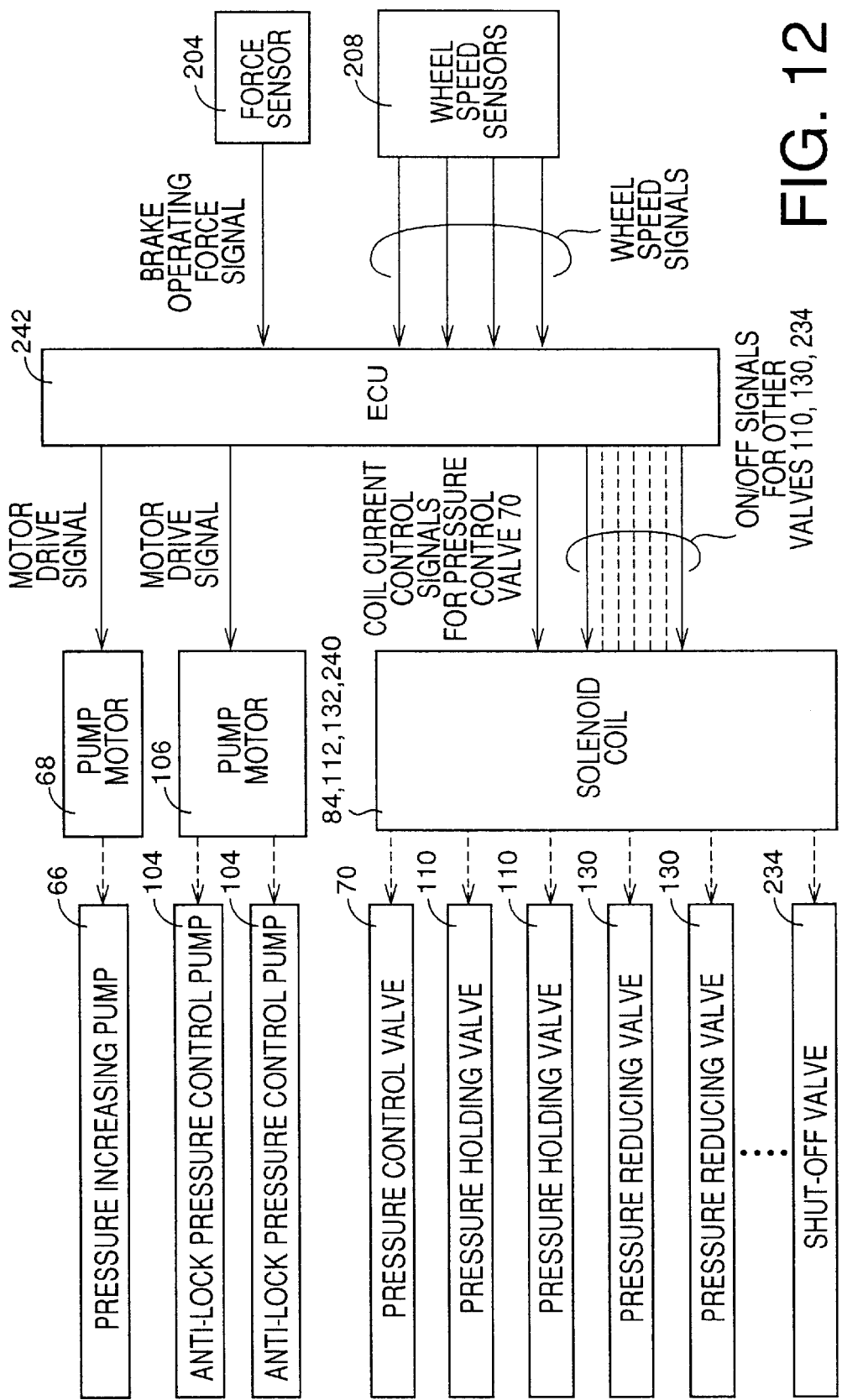
FIG. 12 is a block diagram illustrating an electric arrangement of the braking system of FIG. 11.

The graph of FIG. 10 shows an example of the braking effect characteristic of the braking system which is controlled according to the routine of FIG. 5, that is, an example of controlling the relationship between the brake operating force F and the wheel brake cylinder pressure $P_B$.

As described above, the present embodiment is arranged so that the pressure increase sub-routine of FIG. 6 (step S3 of the braking effect characteristic control routine of FIG. 5) is initiated when the brake operating force F has reached or just exceeded the threshold value $F_{TH}$, which is the value of the brake operating force F when the boosting limit of the booster 12 has been reached where the actual pressure of the negative pressure source (pressure in the intake manifold of the vehicle engine) is at the expected highest level nearest to the atmospheric pressure, that is, equal to the upper limit of the expected fluctuation range of the actual pressure of the negative pressure source. Therefore, where the actual pressure of the negative pressure source is equal to the expected highest value, the pressure increase control sub-routine of FIG. 6 is initiated when the boosting limit of the booster 12 has been reached, as indicated at [A] in FIG. 10, so that the actual braking effect characteristic coincides with an ideal or desired braking effect characteristic (desired F-$P_B$ characteristic) indicated by two-dot straight chain line in FIG. 10. Where the actual pressure of the negative pressure source for the booster 12 is lower than the expected highest level (but higher than the expected lowest level), the pressure increase control sub-routine is undesirably initiated before the boosting limit of the booster 12 has been actually reached, that is, even before the master cylinder pressure $P_M$ is still in the process of being boosted by the boosting function of the booster 12, as indicated at [B] in FIG. 10. In this case where the master cylinder pressure $P_M$ is increased by the pressure increasing device 64 in the terminal boosting period of the booster 12, the wheel brake cylinder pressure P is higher than the desired value (indicated by the two-dot straight chain line), as indicated by solid line [1] in FIG. 10. Where the actual pressure of the negative pressure source is at the expected lowest level (having the largest degree of vacuum), the pressure increase sub-routine is initiated well before the boosting limit of the booster 12 has been reached, as indicated at [C] in FIG. 10. In this case, the wheel brake cylinder pressure $P_B$ is comparatively higher than the desired value.

The solid line [1] in FIG. 10 indicates the F-$P_B$ relationship to be obtained according to the braking effect characteristic control according to the principle of the present invention, where the pressure increase control sub-routine of FIG. 6 is initiated by activation of the pressure increasing pump 66 before the boosting limit of the booster 12 has been actually reached, that is, when the actual pressure of the negative pressure source is equal to the upper limit of the expected fluctuation range, as indicated at [B]. The dashed line [2], on the other hand, indicates a comparative F-$P_B$ relationship which would be obtained where the pressure increasing device 64 were not designed according to the principle of the present invention, namely, were designed such that the overall ratio of the braking force based on the wheel brake cylinder pressure $P_B$ to the brake operating force F is expressed by a product of the actual boosting ratio of the booster 12 after the boosting limit of the booster 12 has been reached, and the nominal boosting ratio of the booster 12 which permits the desired or ideal F-$P_B$ characteristic (indicated by two-dot chain line in FIG. 10) to be established. According to this comparative F-$P_B$ relationship indicated by the dashed line [2}] the actual wheel brake cylinder pressure $P_B$ during the terminal boosting period indicated above considerably deviates from the desired value represented by the ideal F-$P_B$ characteristic (two-dot chain line in FIG. 10). In particular, the amount of deviation of the actual wheel brake cylinder pressure $P_B$ from the desired value is considerably large when the boosting limit of the booster 12 has been reached (at the end of the above-indicated terminal boosting period). This is because the amount of deviation of the actual wheel brake cylinder pressure $P_B$ from the desired value during the terminal boosting period is boosted by the nominal boosting ratio established by the pressure increasing device 64, as indicated by the dashed line [2].

According to the present embodiment of the invention, the amount of deviation of the actual wheel brake cylinder pressure $P_B$ from the desired or ideal value during the terminal boosting period is small, as indicated by the solid line [1], as compared with that according to the comparative F-$P_B$ relationship indicated at [2].

Thus, the pressure increasing device 64 including the ECU 200 assigned to execute the braking effect characteristic control routine of FIG. 5 is arranged to prevent significant deterioration of the operating feel of the brake pedal 10 during the terminal boosting period.

While the braking effect characteristic control routine has been described referring to FIGS. 5-10, there will be described the anti-lock braking pressure control routine.

The anti-lock braking pressure control routine is formulated to selectively place the braking system in a pressure increasing state, a pressure holding state and a pressure reducing state, so as to prevent an excessive locking tendency of each wheel FL, FR, RL, RR during an operation of the brake pedal 10, while monitoring the rotating speeds of the wheels and the running speed of the vehicle based on the output signals of the wheel speed sensors 208. The pressure increasing state is established by holding the pressure holding valve 110 in the open state and the pressure reducing valve 130 in the closed state. The pressure holding state is established by holding both of the valves 110, 130 in the closed state. The pressure reducing state is established by holding the pressure holding valve 110 in the closed state and the pressure reducing valve in the open state. In an anti-lock braking pressure control operation according to the anti-lock braking pressure control routine, the pump motor 106 is kept operated to drive the anti-lock pressure control pumps 104, for pressurizing the fluid received from the reservoirs 120 and returning the pressurized fluid to the main fluid passage 94.

It will be understood from the foregoing description of the present embodiment that the different pumps 68, 104 are used for effecting the pressure increase control sub-routine of FIG. 6 and the anti-lock braking pressure control, respectively, so as to permit independent operations of the different pumps 68, 104 to facilitate the respective controls for attaining the respective purposes with high degrees of accuracy. Further, the use of the pumps 68, 104 permits an operation of the pressure increasing device 64 to effect the pressure increase control as needed, even if the anti-lock pressure control pumps 104 are defective, or an anti-lock braking pressure control operation even if the pump 68 is defective.

In the present embodiment, the fluid pressures in the two front pressurizing chambers 36, 38 are increased by an advancing movement of the first pressurizing piston 32 with the output force of the booster 12 applied to the rear auxiliary piston 46 and the fluid pressure in the rear pressurizing chamber 50, such that the fluid pressures in the four wheel brake cylinders 92 are increased to the same level. In the present braking system including the front sub-system with the two wheel brake cylinders 92 for the front wheels FL, FR and the rear sub-system with the two wheel brake cylinder 92 for the rear wheels RL, RR, a difference if any between the wheel brake cylinder pressure in the front sub-system and the wheel brake cylinder pressure in the rear sub-system will not deteriorate the running stability of the vehicle during brake application. In a braking system of a diagonal or X-crossing type including a first sub-system with the front left wheel brake cylinder and the rear right wheel brake cylinder and a second sub-system with the front right wheel brake cylinder and the rear left wheel brake cylinder, a difference between the wheel brake cylinder pressures in the two sub-systems would cause deterioration of the running stability of the vehicle during brake application. In this respect, the arrangements of the booster 12, master cylinder 14 and pressure increasing device 64 so as to avoid such a pressure difference between the two sub-systems according to the present invention are advantageously applicable to the braking system of the diagonal type, from the standpoint of the running stability of the vehicle.

Referring to FIGS. 11–14, there will be described a braking system constructed according to a second embodiment of this invention. The same reference signs as used in the first embodiment will be used in the second embodiment to identify the same elements, which will not be described. The second embodiment is different from the first embodiment only in the pressure increasing device, as described below in detail.

The braking system according to the present second embodiment uses a master cylinder 220 which is identical with the master cylinder 14 of the first embodiment, except for the provision of a port 222 formed through the cylindrical wall of the housing 20, and a communication passage 224 for communication between the port 222 and the front pressurizing chamber 36 partially defined by the first pressurizing piston 32. The present braking system further uses a pressure increasing device 230 which includes some elements in addition to those of the pressure increasing device 64 of the first embodiment. The additional elements include a communication fluid passage 232 for connecting the port 222 to the pressure increasing port 54. The communication fluid passage 232 is provided with a normally closed solenoid-operated shut-off valve 234 and a first check valve 238 which are connected in series with each other. The check valve 238 is opened when a pressure difference across the check valve 238 exceeds a threshold which is not zero. This threshold will be referred to as "opening pressure difference" of the check valve 238. The shut-off valve 234 includes a solenoid coil 240 (FIG. 12), which is controlled by an electronic control unit (ECU) 242 shown in FIG. 12. The ECU 242 is basically identical in construction with the ECU 200 used in the first embodiment.

The above-indicated pressure difference across the first check valve 238 is the fluid pressure in the front pressurizing chamber 36 minus the fluid pressure in the rear pressurizing chamber 50. When this pressure difference is smaller than the above-indicated opening pressure difference (threshold) which is not zero, the first check valve 238 inhibits the flows of the fluid in the opposite direction between the front pressurizing chamber 36 and the rear pressurizing chamber 50. When the pressure difference exceeds the opening pressure difference, the first check valve 238 is opened to permit the flow of the fluid from the front pressurizing chamber 36 to the rear pressurizing chamber 50, whereby the pressure difference is reduced below the opening pressure difference, and the first check valve 238 is closed again. The pressure increasing device 230 further includes a by-pass passage 246 which by-passes the first check valve 238. This by-pass passage 246 is provided with a second check valve 248 whose opening pressure difference is substantially zero. The second check valve 248 permits a flow of the fluid in the direction from the reservoir 58 toward the front pressurizing chamber 36, and inhibits a flow of the fluid in the reverse direction.

The ROM of a computer of the ECU 242 stores programs for executing a braking effect characteristic control routine and an anti-lock pressure control routine. The braking effect characteristic control routine in this second embodiment includes steps identical with steps S1 and S2 of FIG. 5 of the first embodiment, and steps which correspond to steps S3 and S4 of FIG. 5 but are different from these steps. Namely, the pressure increase control sub-routine and the terminating sub-routine in this second embodiment are illustrated in the flow charts of FIGS. 13 and 14, respectively. The anti-lock pressure control routine in the second embodiment is identical with that in the first embodiment.

Figure 13:
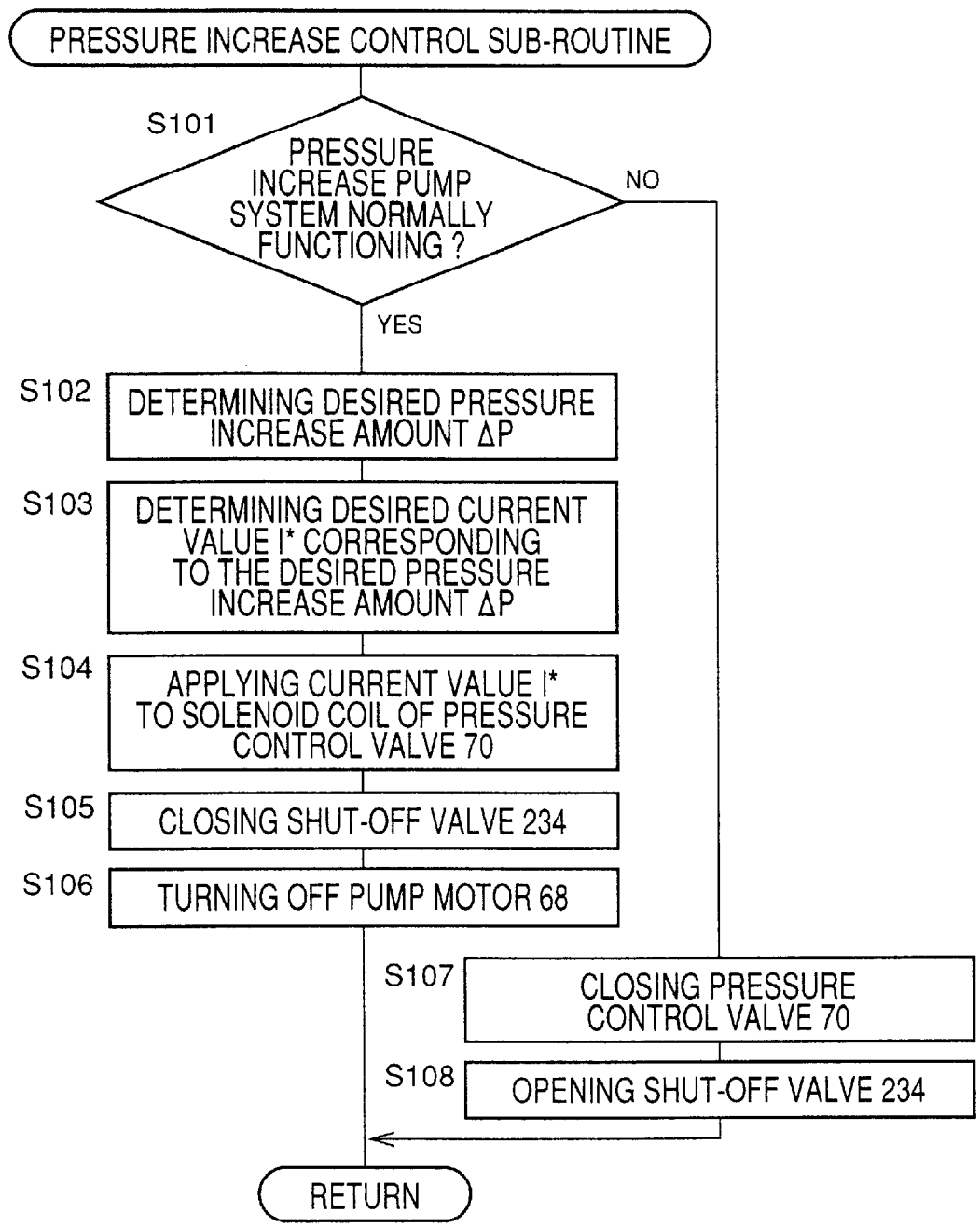
FIG. 13 is a flow chart illustrating a pressure increase control sub-routine executed by a computer of an electronic control unit shown in FIG. 12.

The pressure increase control sub-routine of FIG. 13 is initiated with step S101 to determine whether the pressure increase pump system of the pressure increasing device 230 which includes the pressure increasing pump 66 and the pump motor 68 is normally functioning, that is, whether the fluid pressure in the rear pressurizing chamber 50 can be increased by an operation of the pressure increasing pump 66. For instance, the determination in step S101 is implemented by checking if the pump motor 68 is normally operable without electrical disconnection or short-circuiting. If an affirmative decision (YES) is obtained in step S101, the control flow goes to step S102 to determine the desired increase amount ΔP of the fluid pressure in the rear pressurizing chamber 50, depending upon the currently detected brake operating force F, in the same manner as described above with respect to step S21 of FIG. 6. Then, the control flow goes to step S103 to determine the desired current value I* to be applied to the solenoid coil 84 of the pressure control valve 70, depending upon the determined desired pressure increase amount ΔP, in the same manner as described above with respect to step S22. Step S103 is followed by step S104 to apply the electric current I of the determined desired current value I* to the solenoid coil 84. Then, step S105 is implemented to de-energize the solenoid coil 240 of the shut-off valve 234, for closing the shut-off valve 234. Step S105 is followed by step S106 to turn on the pump motor 68, so that the fluid pressure in the rear pressurizing chamber 50 is raised by the desired pressure increase amount ΔP. Thus, one cycle of execution of the sub-routine of FIG. 13 is terminated.

If the pressure increase pump system of the pressure increasing device 230 is not normally functioning, a negative decision (NO) is obtained in step S101, and the control flow goes to step S107 to energize the solenoid coil 84 of the pressure control valve 70, for closing the pressure control valve 70, so that the fluid pressure in the rear pressurizing chamber 50 can be increased with the chamber 50 being disconnected from the reservoir 58 by the closed pressure control valve. Then, the control flow goes to step S108 to energize the solenoid-coil 240 of the shut-off valve 234, for opening the shut-off valve 234.

With the shut-off valve 234 being open, the pressurized fluid can flow from the front pressurizing chamber 36 into the rear pressurizing chamber 50, if the fluid pressure in the chamber 36 is higher than the fluid pressure in the chamber 50 by more than the opening pressure difference of the first check valve 238. While the pressure difference between the chambers 36, 50 is smaller than the opening pressure difference of the first check valve 238, the flow of the fluid from the chamber 36 into the chamber 50 is inhibited by the closed first check valve 238, and fluid pressure in the chamber 50 cannot be raised by the fluid pressure in the chamber 36. Accordingly, the master cylinder 220 is operated by only the output force received from the booster 12, and the fluid in the chamber 36 pressurized by an advancing movement of the first pressurizing piston 32 is delivered to the wheel brake cylinders 92, without any amount of flow of the fluid from the chamber 36 into the chamber 50. Thus, fast filling of the wheel brake cylinders 92 is effected, so as to restrict the deterioration of the operating feel of the brake pedal 10 which would otherwise take place due to a slow increase of the wheel brake cylinder pressure $P_B$ with an increase in the operating amount of the brake pedal 10, when the brake pedal 10 is depressed relatively rapidly. After the fluid pressure difference between the chambers 36, 50 has exceeded the opening pressure difference of the first check valve 238 as a result of a further operation of the brake pedal 10, the pressurized fluid in the chamber 36 is permitted to flow into the chamber 50, so that the fluid pressure in the chamber 50 is raised, whereby the master cylinder 220 is operated by not only the booster 12 but also the fluid pressure in the first pressurizing chamber 36 of the master cylinder 220 per se. This arrangement permits an increase in the fluid pressure in the rear pressurizing chamber 50 in the event of a failure of the pressure increase pump system of the pressure increasing device 230, that is, in the event of a failure of the pressure increasing device 230 to increase the master cylinder pressure $P_M$ by an electric control of the pressure increasing device 230. Accordingly, the present braking system is operable to perform the intended braking operation even if the electrically controlled pressure increasing device 230 is defective.

Where the volume of the front pressurizing chamber 36 is increased at a high rate with the brake pedal 10 being rapidly released to its non-operated position, the fluid is permitted to flow from the reservoir 58 into the chamber 36 through the check valve 76 and second check valve 248 whose opening pressure differences are substantially zero, and through the port 222 and the communication passage 224, so that the fluid pressure in the chamber 36 is prevented from being lowered below the atmospheric pressure even if the brake pedal 10 is rapidly released.

Figure 14:
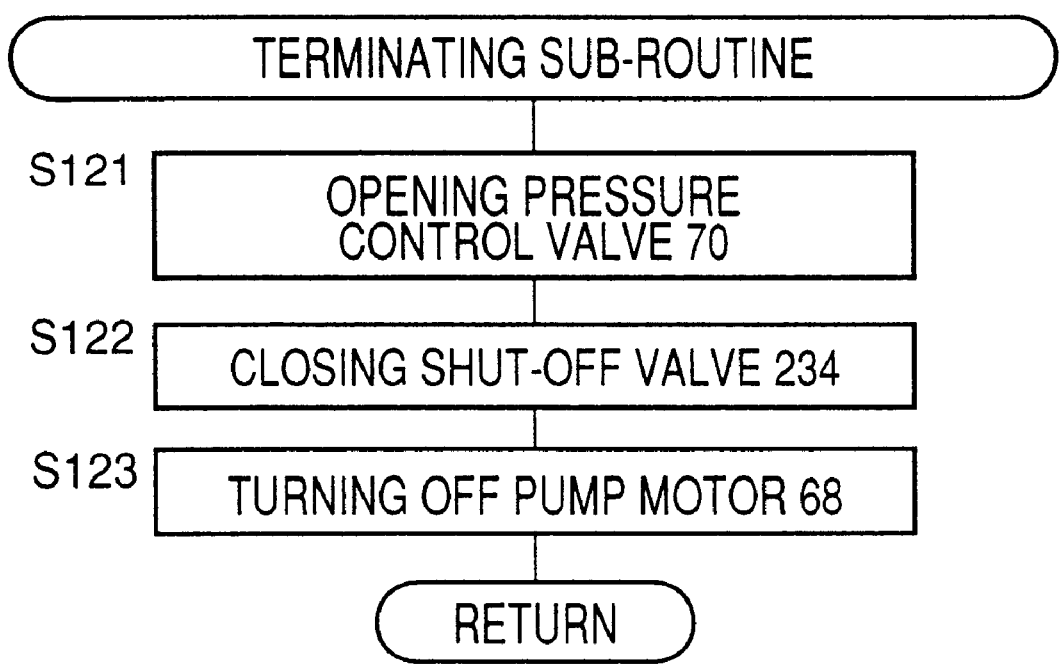
FIG. 14 is a flow chart illustrating a terminating sub-routine executed by the computer of the electronic control unit shown in FIG. 12.

On the other hand, the terminating sub-routine of FIG. 14 is initiated with step S121 to de-energize the solenoid coil 84 of the pressure control valve 70, for thereby opening the pressure control valve 70. Then, step S122 is implemented to de-energize the solenoid coil 240 of the shut-off valve 238, for thereby closing the shut-off valve 238. Accordingly, the front pressurizing chamber 36 is disconnected from both the rear pressurizing chamber 50 and the reservoir 58. Then, the control flow goes to step S123 to turn off the pump motor 68. Thus, one cycle of execution of the sub-routine of FIG. 14 is terminated.

Figure 15:
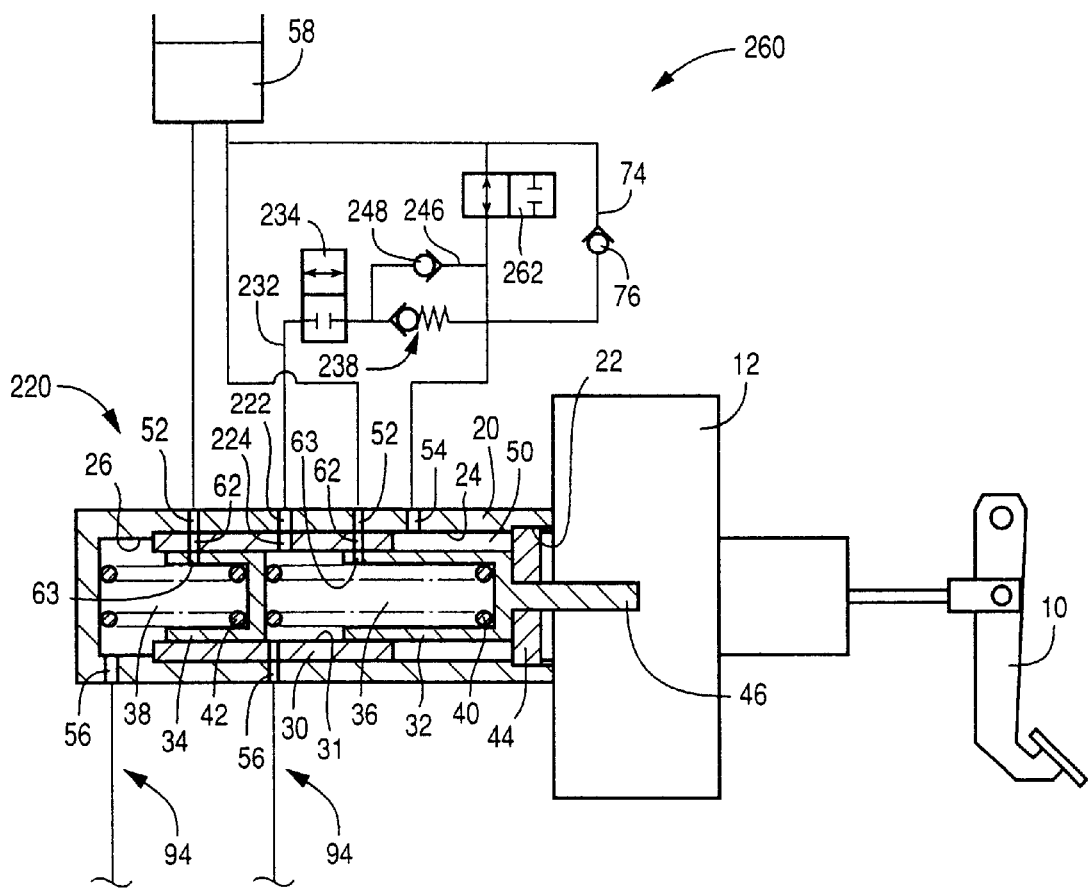
FIG. 15 is a schematic view showing a mechanical arrangement of a braking system constructed according to a third embodiment of this invention.
Figure 16:
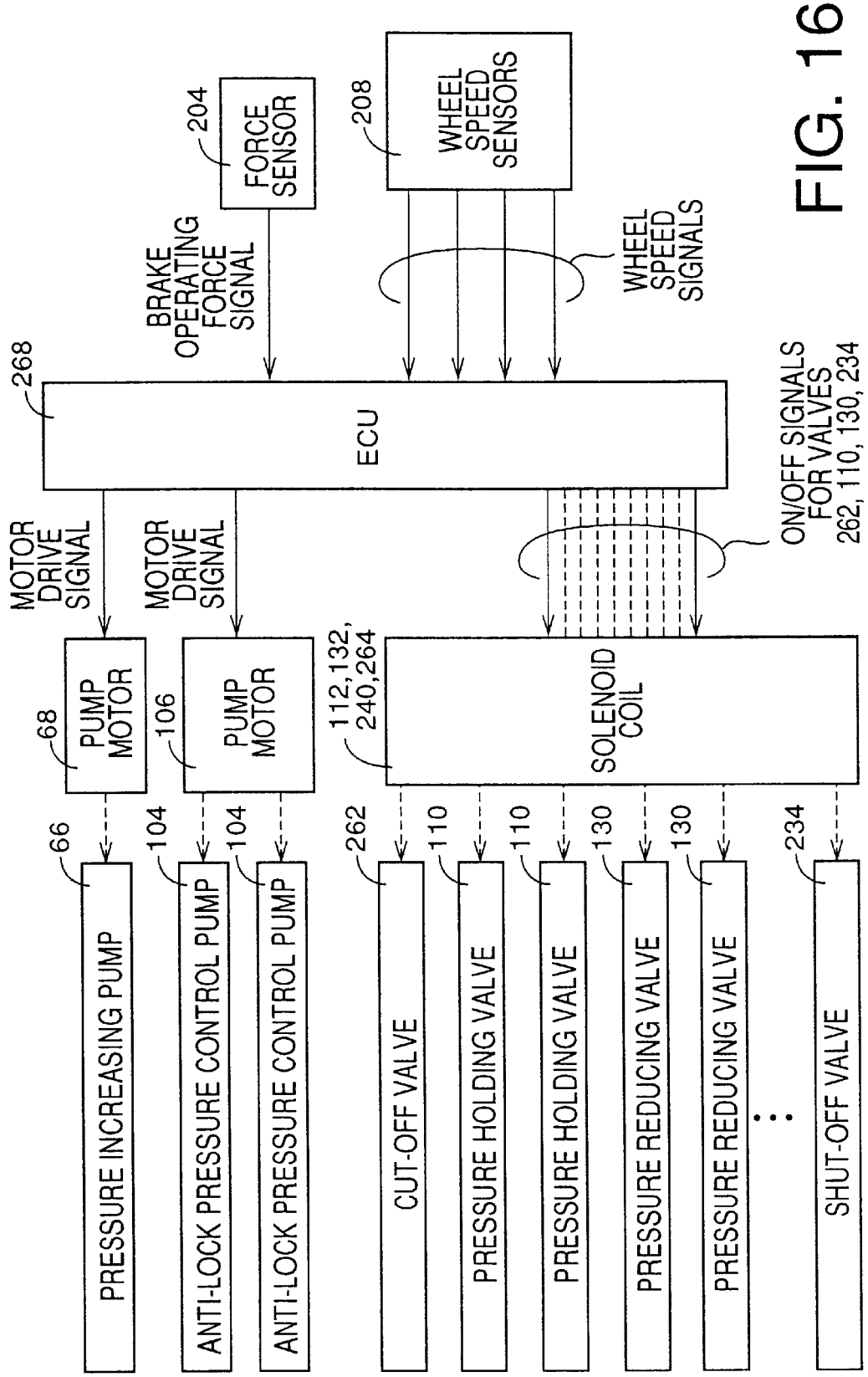
FIG. 16 is a block diagram illustrating an electric arrangement of the braking system of FIG. 15.

Referring next to FIGS. 15–17, there will be described a braking system constructed according to a third embodiment of this invention. The same reference signs as used in the second embodiment will be used in the third embodiment to identify the same elements, which will not be described. The third embodiment is different from the second embodiment only in the pressure increasing device, as described below in detail.

For increasing the fluid pressure $P_M$ in the master cylinder 220 so as to effect the braking effect characteristic control, the second embodiment includes a first pressure increasing portion including the pressure increasing pump 66, and a second pressure increasing portion which includes the communication fluid passage 232 for connecting the pressurizing chambers 36 and 50 and which is activated in the event of a failure of the first pressure increasing portion. However, the present third embodiment includes only a single pressure increasing portion which corresponds to the second pressure increasing portion of the second embodiment but is always activated when the pressure increase sub-routine is effected.

As shown in FIG. 15, the braking system according to the third embodiment uses a pressure increasing device 260, which does not include the pressure increasing pump 66, motor 68 and pressure control valve 70 that are used in the second embodiment. However, the pressure increasing device 260 includes a solenoid-operated cut-off valve 262 in place of the pressure control valve 70. The cut-off valve 262, which is normally held open, is closed when a solenoid coil 264 (FIG. 16) is energized. The solenoid coil 262 is controlled by an electronic control unit (ECU) 268, as indicated in FIG. 16.

The ROM of a computer of the ECU 268 stores programs for executing a braking effect characteristic control routine and an anti-lock pressure control routine. The braking effect characteristic control routine in this third embodiment includes steps identical with steps S1 and S2 of FIG. 5, and steps which correspond to steps S3 and S4 of FIG. 5 but are different from these steps. Namely, the pressure increase control sub-routine and the terminating sub-routine in this second embodiment are illustrated in the flow charts of FIGS. 17 and 18, respectively. The anti-lock pressure control routine in the second embodiment is identical with that in the first and second embodiments.

The braking effect characteristic control sub-routine of FIG. 17 is initiated with step S201 to energize the solenoid coil 264 of the cut-off valve 262, for closing the cut-off valve 262, so that the fluid pressure in the rear pressurizing chamber 50 can be raised by the fluid pressurized in the front pressurizing chamber 36. Then, the control flow goes to step S202 to energize the solenoid coil 240 of the shut-off valve 234, for opening the shut-off valve 234, so that the fluid pressure in the chamber 50 can be raised by the fluid pressure in the chamber 36 when the pressure difference between the chambers 36, 50 is larger than the opening pressure difference of the first check valve 238. Thus, one cycle of execution of the sub-routine 17 is terminated.

On the other hand, the terminating sub-routine of FIG. 18 is initiated with step S221 to de-energize the solenoid coil 264 of the cut-off valve 262, for thereby opening the cut-off valve, so that the fluid is permitted to flow between the chamber 50 and the reservoir 58 in the opposite directions. Then, step S222 is implemented to de-energize the solenoid coil 240 of the shut-off valve 234, for thereby closing the shut-off valve 234, so that the chamber 36 is disconnected from both the chamber 50 and the reservoir 58. Thus, one cycle of execution of the terminating sub-routine of FIG. 18 is terminated.

Referring next to FIGS. 19–22, there will be described a braking system constructed according to a fourth embodiment of this invention. The same reference signs as used in the first embodiment will be used in the fourth embodiment to identify the same elements, which will not be described. The fourth embodiment is different from the first embodiment only in the pressure increasing device, as described below in detail.

While the first embodiment is adapted such that the pressure increasing pump 66 is operated to pressurize the fluid in the rear pressurizing chamber 50, the present fourth embodiment is arranged such that the fluid is in the rear pressurizing chamber 50 is pressurized by a control piston which is linearly moved by a pressure increasing motor.

Described in detail by reference to FIG. 19, the braking system uses a pressure increasing device 300 which includes a hydraulic cylinder 302. The hydraulic cylinder 302 includes a cylindrical housing 304, and a control piston 306 substantially fluid-tightly and slidably received within the housing 304. The control piston 306 and the housing 304 cooperate to define a control pressure chamber 308, so that the fluid pressure in the control pressure chamber 308 is increased with an advancing movement of the control piston 306. The control pressure chamber 308 is held in communication with the rear pressurizing chamber 50 of the master cylinder 14. The housing 304 has a control port 310 formed through its cylindrical wall. The position of the control port 310 in the axial direction of the housing 304 is determined so that the control port 310 can be closed by the control piston 306 during the axial movement of the control piston 306. When the control piston 306 is placed in its original or initial position of FIG. 19, the control port 310 is open, without being closed by the outer circumferential surface of the control piston 306. When the control piston 306 has been advanced from the original position by a given distance, the control portion 310 is closed by the control piston 306. The control port 310 is held in communication with the reservoir 58.

The pressure increasing device 300 further includes a pressure increasing electric motor 312, a speed reducer 314, and a ballscrew 316.

Figure 20:
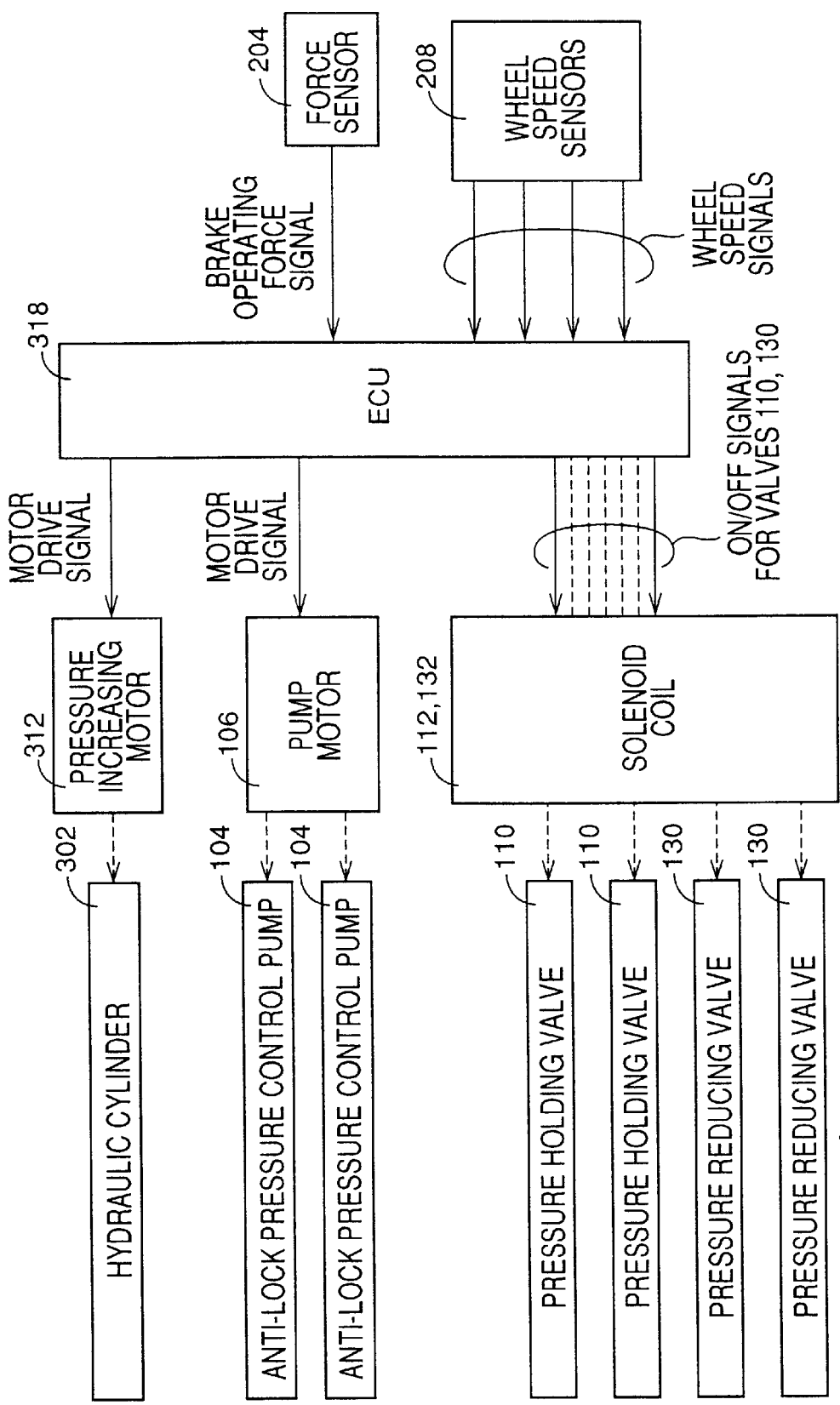
FIG. 20 is a block diagram illustrating an electric arrangement of the braking system of FIG. 19.

The pressure increasing electric motor 312 is controlled by an electronic control unit (ECU) 318 shown in FIG. 20.

Figure 19:
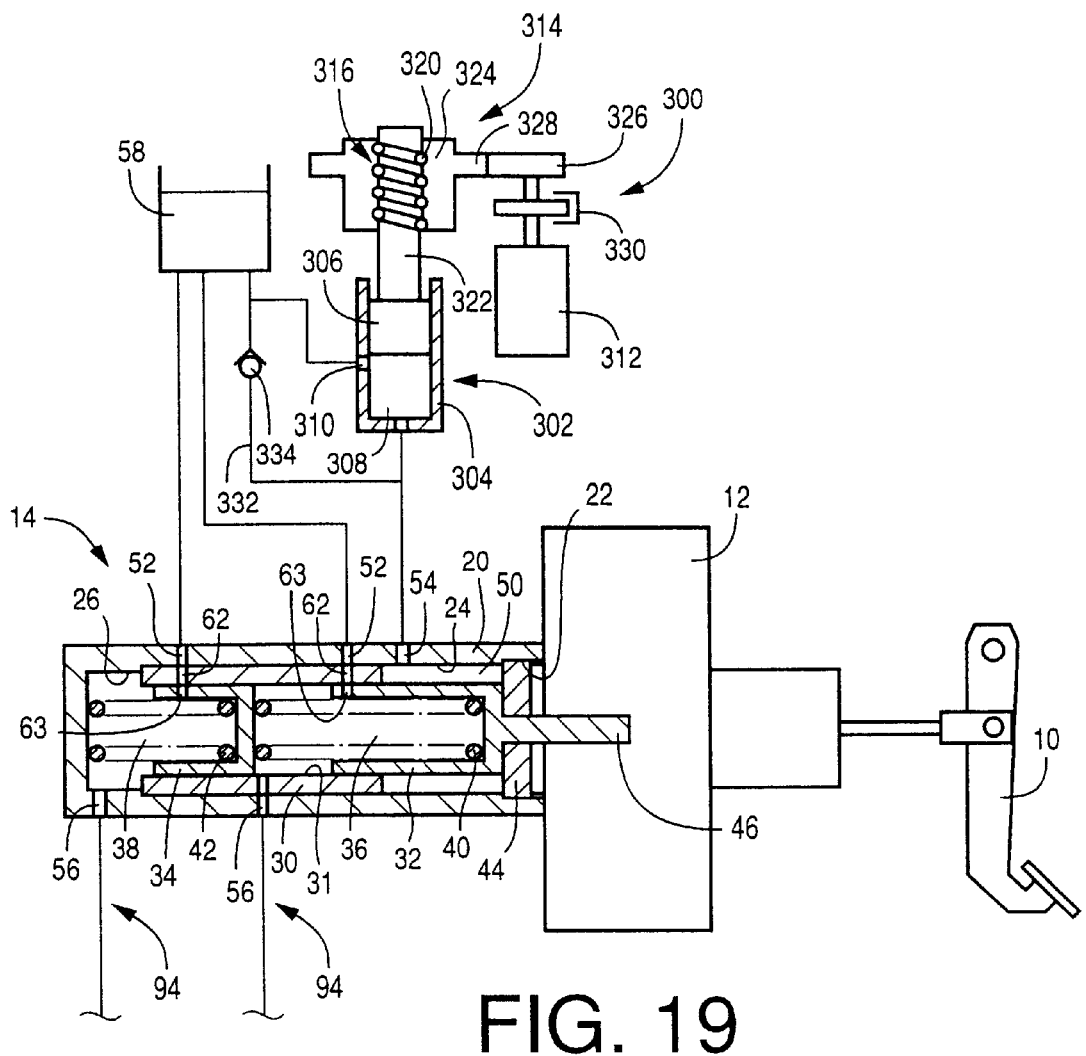
FIG. 19 is a schematic view showing a mechanical arrangement of a braking system constructed according to a fourth embodiment of this invention.

As shown in FIG. 19, the ballscrew 316 includes an externally threaded portion 322 which engages an internally threaded member in the form of a nut 324 through balls 320 interposed therebetween, such that the balls 320 are circulated around the threaded portion 322. The externally threaded portion 322 is supported by a suitable structure such that the threaded portion 322 is axially movable but is not rotatable, while the nut 324 is supported by a suitable structure such that the nut 324 is rotatable but is not axially movable. Accordingly, a rotary motion of the nut 324 driven by the electric motor 312 is converted into a linear or axial motion of the externally threaded member 322. Since the control piston 306 is formed integrally with the externally threaded portion 322, the control piston 306 is axially moved when the threaded member 322 is axially moved, so that the volume of the control pressure chamber 308 is changed. It will be understood that the ballscrew 316 and the nut 324 constitute a motion converting mechanism for converting a rotary motion of the electric motor 312 into a linear motion of the control piston 306.

The speed reducer 314 is interposed between the nut 324 and the output shaft of the electric motor 312. The speed reducer 314 includes a small-diameter gear 324 which is rotated with the output shaft of the motor 312, and a large-diameter gear 328 which is rotated with the nut 324 and which meshes with the small-diameter gear 324. In this arrangement, the rotary force of the motor 312 is boosted by the speed reducer 314 before it is transmitted to the nut 324.

The output shaft of the pressure increasing motor 312 is provided with a clutch 330 which functions to mechanically prevent a retracting movement of the control piston 308 to thereby prevent lowering of the fluid pressure in the control pressure chamber 308, when the motor 312 is de-energized.

The pressure increasing device 300 has a by-pass passage 332 which by-passes the control pressure chamber 308 of the hydraulic cylinder 302. The by-pass passage 332 is provided with a check valve 334 whose opening pressure difference is substantially zero. Like the check valve 76 provided in the first embodiment, the check valve 334 permits a flow of the fluid in the direction from the reservoir 58 toward the rear pressurizing chamber 50, and inhibits a flow of the fluid in the reverse direction.

The ROM of a computer of the ECU 318 stores programs for executing a braking effect characteristic control routine and an anti-lock pressure control routine. The braking effect characteristic control routine in this fourth embodiment includes steps identical with steps S1 and S2 of FIG. 5 of the first embodiment, and steps which correspond to steps S3 and S4 of FIG. 5 but are different from these steps. Namely, the pressure increase control sub-routine and the terminating sub-routine in this fourth embodiment are illustrated in the flow charts of FIGS. 21 and 22, respectively. The anti-lock pressure control routine in the fourth embodiment is identical with that in the first embodiment.

Figure 21:
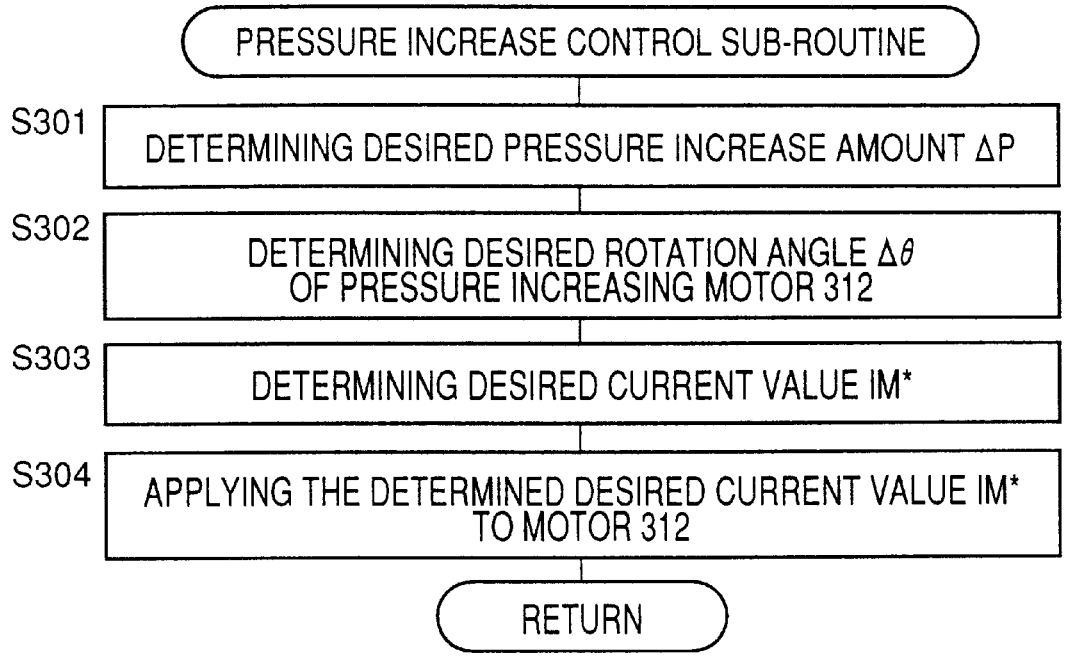
FIG. 21 is a flow chart illustrating a pressure increase control sub-routine executed by a computer of an electronic control unit shown in FIG. 20.

The pressure increase control sub-routine of FIG. 21 is initiated with step S301 to determine the desired amount $\Delta P$ of increase of the fluid pressure in the rear pressurizing chamber 50, depending upon the currently detected brake operating force F, in the same manner as in step S21. Then, step S302 is implemented to determine a desired rotating angle $\Delta \theta$ of the pressure increasing motor 312 that is necessary to establish the desired rotating angle $\Delta \theta$. A predetermined relationship between the desired pressure increase amount $\Delta P$ and the desired rotating angle $\Delta \theta$ is stored in the ROM of the computer of the ECU 318. The desired rotating angle $\Delta \theta$ is determined on the basis of the desired pressure increase amount $\Delta P$ and according to the predetermined $\Delta P$-$\Delta \theta$ relationship. Then, the control flow goes to step S303 to determine a desired value IM* of the electric current IM to be applied to the pressure increasing motor 312, which value IM* is required to rotate the output shaft of the motor 312 by the desired rotating angle $\Delta \theta$. A predetermined relationship between the desired rotating angle $\Delta \theta$ and the desired current value IM* is stored in the ROM. The desired current value IM* is determined on the basis of the desired rotating angle $\Delta \theta$ and according to the predetermined IM*-$\Delta \theta$ relationship. Step S303 is followed by step S304 to apply the electric current IM of the desired value IM* to the pressure increasing motor 312, so that the, motor 312 is operated by the desired rotating angle $\Delta \theta$. As a result, the fluid pressure in the control pressure chamber 308, and therefore the fluid pressure in the rear pressurizing chamber 50 are increased by the desired pressure increase amount $\Delta P$. Accordingly, the first pressurizing piston 32 is advanced to increase the fluid pressure in the master cylinder 14. Thus, one cycle of execution of the sub-routine of FIG. 21 is terminated.

Figure 22:
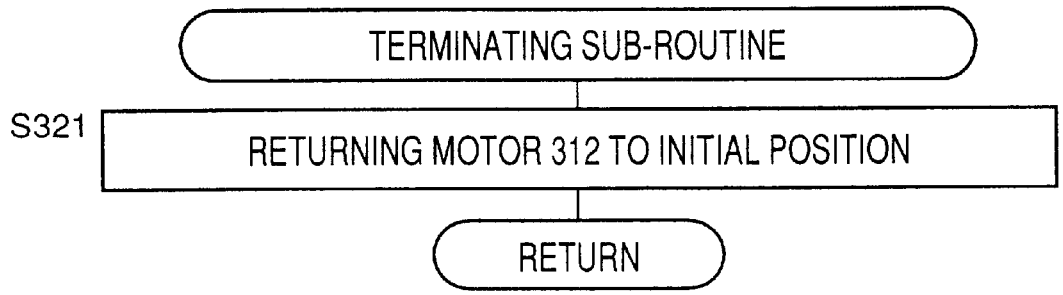
FIG. 22 is a flow chart illustrating a terminating sub-routine executed by the computer of the electronic control unit shown in FIG. 20.

On the other hand, the terminating sub-routine of FIG. 22 consists of a single step S321 wherein the pressure increasing motor 312 is operated in the reverse direction, to its initial or original position, and is turned off. Thus, one cycle of execution of the sub-routine of FIG. 22 is terminated.

Figure 23:
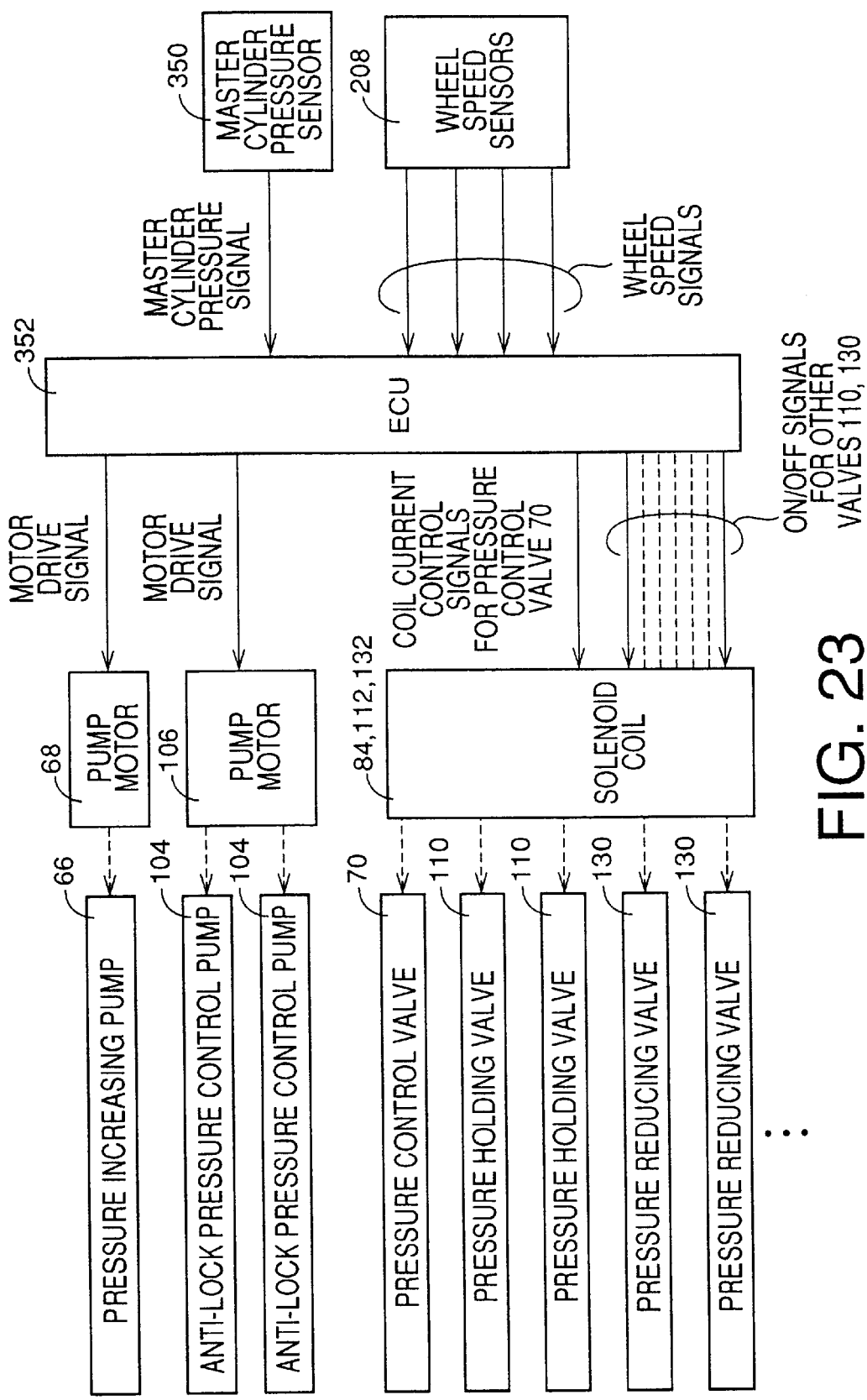
FIG. 23 is a block diagram illustrating an electric arrangement of a braking system according to a fifth embodiment of this invention.
Figure 24:
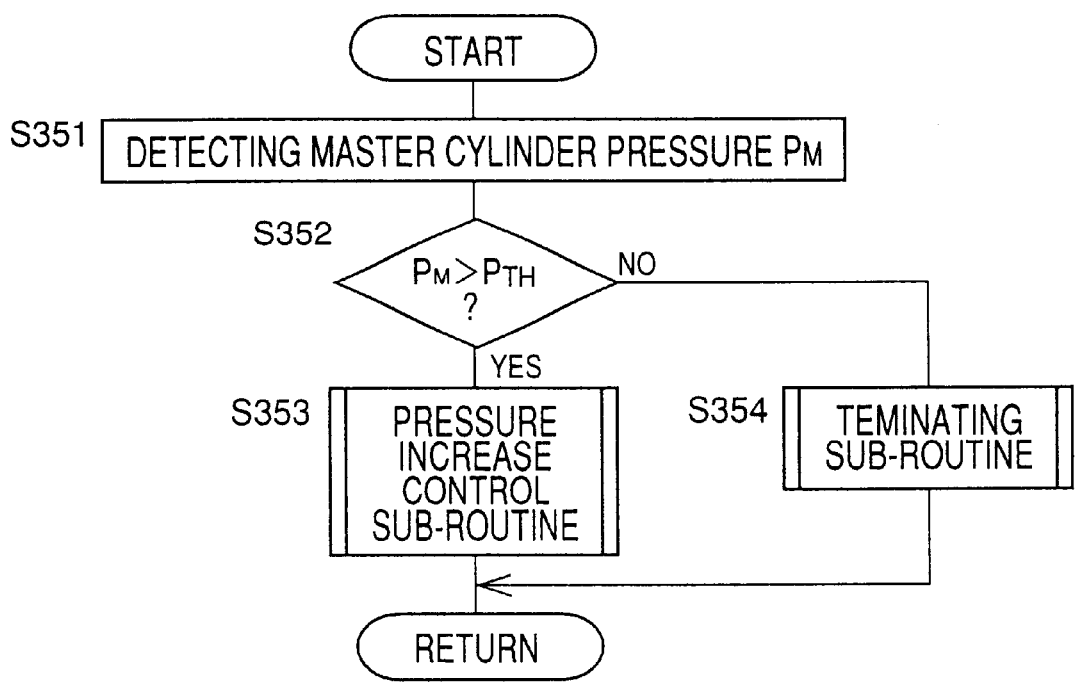
FIG. 24 is a flow chart illustrating a braking effect characteristic control routine executed by a computer of an electronic control unit shown in FIG. 23
Figure 25:
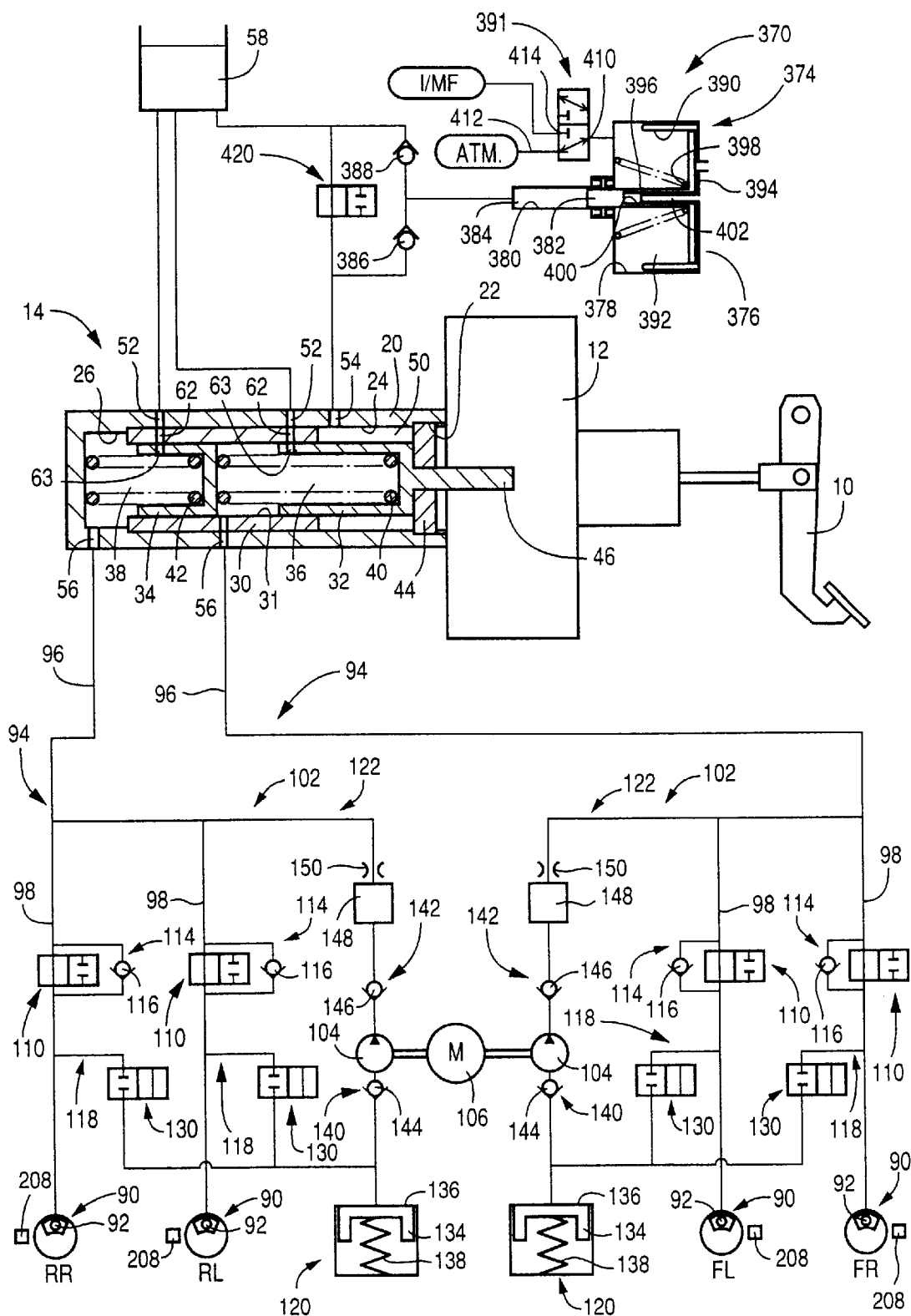
FIG. 25 is a schematic view showing a mechanical arrangement of a braking system according to a sixth embodiment of this invention.

Referring to FIGS. 23 and 24, there will be described a fifth embodiment of this invention, which is identical with the first embodiment, except for the use of a master cylinder pressure sensor 350 in place of the brake operating force sensor 204. Only the different of the fifth embodiment from the first embodiment will be described.

In the braking system of the first embodiment, the brake operating force F is used as a physical quantity for controlling the pressure increasing device 64. The brake operating force F is an example of physical quantities of elements disposed upstream of the pressure increasing device 64, as viewed in the direction of transfer of the force from the brake pedal 10 to the master cylinder 14. In the present fifth embodiment, the master cylinder pressure $P_M$ is used as the physical quantity for controlling the pressure increasing device 64. The pressure $P_M$ is a physical quantity of an element (master cylinder 14) disposed downstream of the pressure increasing device. As indicated in FIG. 23, the master cylinder pressure $P_M$ is detected by the master cylinder pressure sensor 350, which is connected to an electronic control device (ECU) 352.

The ROM of a computer of the ECU 352 stores programs for executing a braking effect characteristic control routine and an anti-lock pressure control routine. The braking effect characteristic control routine in this fifth embodiment includes steps which correspond to steps S1–S3 of FIG. 5 but are different from these steps, and a step identical with step S4 of FIG. 5. Namely, the braking effect characteristic control routine in the fifth embodiment is illustrated in the flow charts of FIG. 24. anti-lock pressure control routine in the fifth embodiment is identical with that in the first embodiment.

The braking effect characteristic control routine of FIG. 24 is repeatedly executed after the ignition switch of the vehicle is turned on. Each cycle of execution of the routine is initiated with step S351 to detect the fluid pressure $P_M$ in the master cylinder 14 on the basis of a master cylinder pressure signal generated by the master cylinder pressure sensor 350. Then, the control flow goes to step S352 to determine whether the detected master cylinder pressure $P_M$ has been increased to a predetermined threshold value $P_{TH}$, which corresponds to the threshold value $F_{TH}$ used in the first embodiment. If an affirmative decision (YES) is obtained in step S352, the control flow goes to step S353 in which the pressure increase control sub-routine is executed. If a negative decision (NO) is obtained in step S352, the control flow goes to step S354 in which the terminating sub-routine is executed in the same manner as in step S4. Thus, one cycle of execution of the braking effect characteristic control routine is terminated.

In the present fifth embodiment, the pressure increasing device 64 is controlled on the basis of the detected master cylinder pressure $P_M$, which is a physical quantity influenced by the pressure increase control by the pressure increasing device 64. In this respect, the fifth embodiment is different from the first embodiment wherein the pressure increasing device 64 is controlled on the basis of the detected brake operating force F, which is a physical quantity not influenced by the pressure increase control. Although the pressure increase sub-routine of step S353 in the fifth embodiment is basically identical with that of FIG. 6 in the first embodiment, the pressure increase sub-routine of step S353 is different from the sub-routine of FIG. 6, due to the use of the master cylinder pressure $P_M$ rather than the brake operating force F, as described below in detail.

In the first embodiment wherein the pressure increasing device 64 is controlled on the basis of the detected brake operating force F, the master cylinder pressure $P_M$ when the pressure increase control by the pressure increasing device 64 is not effected can be estimated from the detected brake operating force F. In the present fifth embodiment wherein the pressure increasing device 64 is controlled on the basis of the detected master cylinder pressure $P_M$, this detected pressure $P_M$ can be used as a quantity corresponding to the brake operating force F, before the pressure increase control by the pressure increasing device 64 is initiated. After the pressure increase control is initiated, the detected master cylinder pressure $P_M$ cannot be used as a quantity corresponding to the brake operating force F. However, there exists a given relationship between the detected master cylinder pressure $P_M$ influenced by the pressure increase control and the master cylinder pressure $P_M$ not influenced by the pressure increase control (i.e., master cylinder pressure $P_M$ where the pressure increase is not effected). The present fifth embodiment utilizes this relationship, to estimate the value of the master cylinder pressure $P_M$ where the pressure increase control is effected, and determine the desired pressure increase amount $\Delta P$ on the basis of the estimated value of the master cylinder pressure $P_M$.

It is noted that the working fluid (in the master cylinder 14) whose pressure $P_M$ is detected by the master cylinder pressure sensor 350 has some degree of vibration damping property. Namely, the output of the master cylinder pressure sensor 350 indicative of the master cylinder pressure $P_M$ can be relatively easily smoothed so as to remove an external disturbance in the form of a pressure pulsation of of the fluid in the master cylinder 14. On the other hand, the output of the the brake operating force sensor 240 indicative of the brake operating force F cannot be easily smoothed, without a special arrangement to remove a vibration of the force F. In this respect, the braking force desired by the vehicle operator can be more accurately detected by the master cylinder pressure sensor 350, than by the brake operating force sensor 240.

Like the other sensors provided on the automotive vehicle, the master cylinder pressure sensor 350 is preferably subjected to an initial diagnosis prior to the initiation of the braking effect characteristic control routine after the ignition switch is turned on. Items of the initial diagnosis include not only static diagnostic checkings for electrical disconnection, short-circuiting, etc. of the sensor 350, but also a dynamic diagnostic checking to see a relationship between the actual and detected values of the master cylinder pressure $P_M$. This dynamic diagnostic checking of the master cylinder pressure sensor 350 is possible in the present braking system wherein the master cylinder 14 can be activated, that is, the first pressurizing piston 32 can be activated by applying a hydraulic pressure to the rear pressurizing chamber 50 by operating the pressure increasing device 64, at a position upstream of the master cylinder 14. In a braking system wherein the master cylinder pressure is increased at a position downstream of the master cylinder 14, however, such a dynamic diagnostic checking is not possible before the brake operating member is actually operated.

In the present fifth embodiment, the master cylinder pressure $P_M$ detected by the master cylinder pressure sensor 350 is substantially the same as the wheel brake cylinder pressure $P_B$. Accordingly, the pressure sensor 350 can be used to detect the wheel brake cylinder pressure $P_B$, so that the accuracy of control of the wheel brake cylinder pressure $P_B$ can be easily improved in the present embodiment, than in a braking system wherein the wheel brake cylinder pressure cannot be detected.

Referring to FIGS. 25–31, there will be described a braking system according to a sixth embodiment of this invention. The same reference signs as used in the first embodiment will be used in the sixth embodiment to identify the same elements, which will not be described. The sixth embodiment is different from the first embodiment only in the pressure increasing device, as described below in detail.

As described above, the first embodiment is constructed such that the pump motor 68 is used as a drive power source for operating a hydraulic pump in the form of the pressure increasing pump 66 in the pressure increasing device 64, to pressurize the fluid in the rear pressurizing chamber 50. On the other hand, the present sixth embodiment uses a pressure increasing device 370, which uses the negative pressure in the intake manifold of the engine of the automotive vehicle, as a drive power source for operating a vacuum pump 374 to effect a pumping action for pressurizing the fluid in the rear pressurizing chamber 50.

The vacuum pump 374 includes a housing 376 having a stepped cylindrical bore including a large-diameter portion 378 and a small-diameter portion 380 which are concentric with each other. A plunger 382 is substantially fluid-tightly and slidably received in the small-diameter portion 380, such that the plunger 382 cooperates with the small-diameter portion 380 to define a pump chamber 384 in front of the plunger 382. The pump chamber 384, which is filled with the working fluid, is connected to the rear pressurizing chamber 50 and the reservoir 58 through a delivery valve 386 and a suction valve 388, respectively. The delivery valve 386 is a check valve which permits a flow of the fluid in a direction from the pump chamber 384 toward the rear pressurizing chamber 50 and inhibits a flow of the fluid in the reverse direction. The suction valve 388 permits a flow of the fluid in the direction from the reservoir 58 toward the pump chamber 384 and inhibits the flow of the fluid in the reverse direction. In this arrangement, the fluid pressurized by an advancing movement of the plunger 382 so as to reduce the volume of the pump chamber 384 is delivered to only the rear pressurizing chamber 50, and only the fluid supplied from the reservoir 58 can be sucked into the pump chamber 384 when the plunger 382 is retracted so as to increase the volume of the pump chamber 384.

The space in the large-diameter portion 378 of the cylindrical bore in the housing 376 is divided by a diaphragm 390 into a variable-pressure chamber 392 and an atmospheric pressure chamber 394. The variable-pressure chamber 392 is connected to a three-way valve 391 while the atmospheric pressure chamber 394 is exposed to the atmosphere. The diaphragm 390 is air-tightly and slidably fitted at its outer circumferential surface in the inner circumferential surface of the large-diameter portion 378, and air-tightly and fixedly mounted at its inner circumferential surface on the outer circumferential surface of a projecting portion 396 of the plunger 382 which projects from the small-diameter portion 380. A return spring 398 is disposed in the variable-pressure chamber 392, so as to bias the plunger 382 and the diaphragm 390 toward an initial position of FIG. 25.

The projecting portion 396 of the plunger 382 has a guide hole 400, and a guide shaft 402 fixed to the housing 376 slidably engages the guide hole 400, so that the plunger 382 is axially guided by the guide shaft 402. Thus, the space within the large-diameter portion 378 is effectively used for guiding the plunger 382, whereby the required axial dimension of the vacuum pump 374 is minimized.

Figure 26:
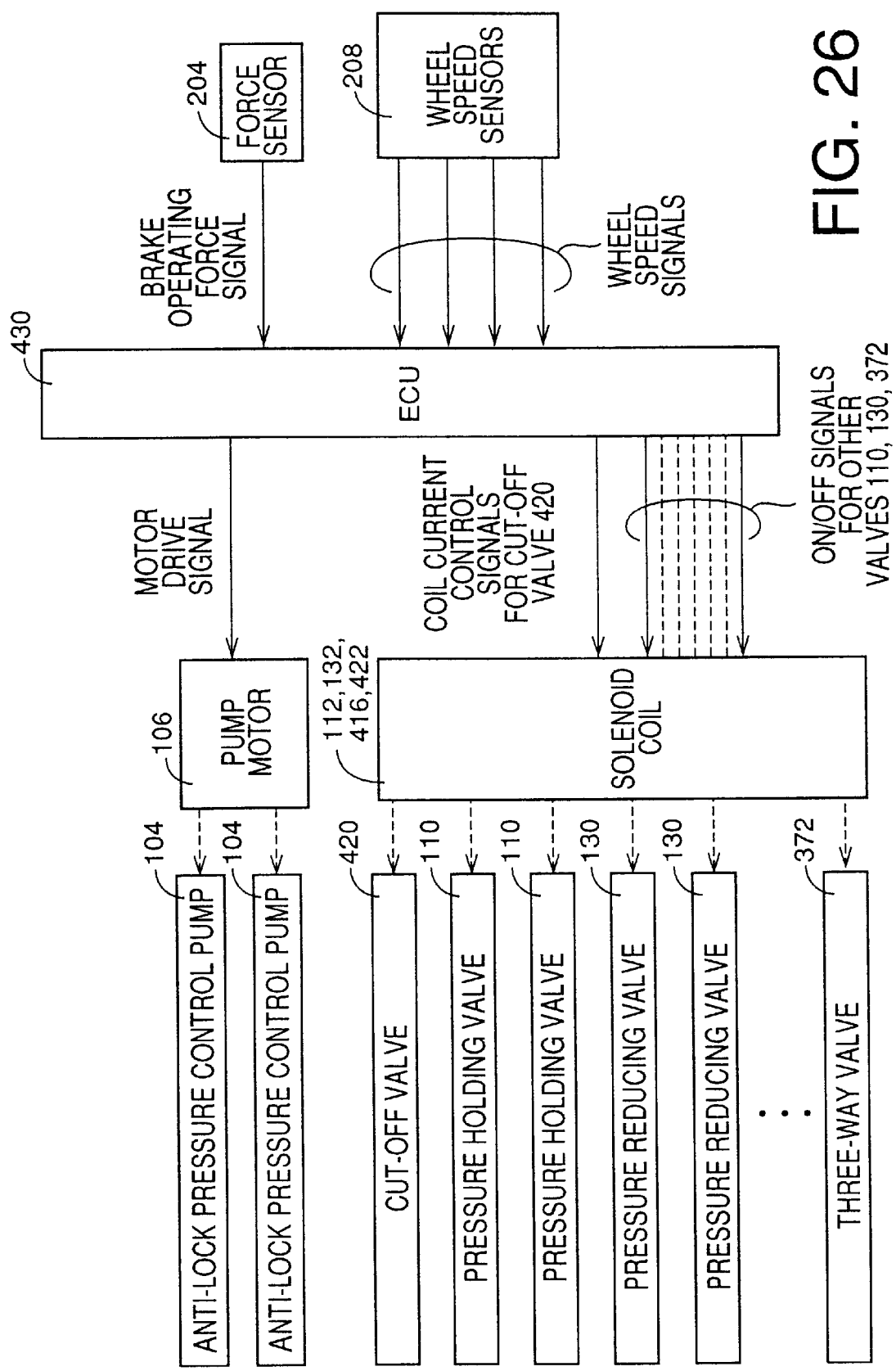
FIG. 26 is a block diagram illustrating an electric arrangement of the braking system of FIG. 25.

The three-way valve 391 indicated above has a first, a second and a third port 410, 412, 414, and includes a solenoid coil 416 (FIG. 26). When the solenoid coil 416 is in a de-energized state, the three-way valve 391 is placed in a first state in which the first port 410 communicates with the second port 412 and does not communicate with the third port 414. When the solenoid coil 416 is in an energized state, the three-way valve 391 is placed in a second state in which the first port 410 communicates with the third port 414 and does not communicate with the second port 412. The first, second and third portions 410, 412, 414 are connected to the variable-pressure chamber 392, the atmosphere and the intake manifold (indicated as I/MF in FIG. 25), respectively. Accordingly, when the three-way valve 391 is placed in the first state, the atmospheric pressure is applied to the variable-pressure chamber 392, causing the plunger 382 to be retracted so as to increase the volume of the pump chamber 384. When the valve 391 is placed in the second state, the negative pressure of the intake manifold is introduced into the variable-pressure chamber 392, causing the plunger 382 to be advanced so as to reduce the volume of the pump chamber 384. As described below in detail, the solenoid coil 416 is alternately energized and de-energized during execution of a braking effect characteristic control routine. As a result, the atmospheric pressure and the negative pressure are alternately applied to the variable-pressure chamber 392, whereby the diaphragm 390 is reciprocated due to an alternate change of a difference between the pressures in the variable-pressure chamber 392 and the atmospheric pressure chamber 394. When the three-way valve 391 is in the first state with the solenoid coil 416 being de-energized, the plunger 382 is retracted with the diaphragm 390 so that the fluid supplied from the reservoir 58 is sucked into the pump chamber 384. When the valve 391 is in the second state with the solenoid coil 416 being energized, the plunger 382 is advanced with the diaphragm 390 so that the fluid pressurized in the pump chamber 384 is delivered into the rear pressurizing chamber 50.

Thus, the vacuum pump 374 is operated to perform a pumping operation for intermittently increasing the fluid pressure in the rear pressurizing chamber 50.

It will be understood that the pressure increasing device 70 used in the present sixth embodiment includes the vacuum pump 374, the three-way valve 391, the delivery valve 386 and the suction valve 388, and that the vacuum pump 374 includes the diaphragm 390, and the housing 376 and plunger 382 which cooperate to define the pump chamber 384.

In the vacuum pump 374 thus constructed, the plunger 382 has the rear projecting portion 396 connected to an input portion in the form of the diaphragm 390, and the front end portion partially defining the pump chamber 384 which serves as an output portion. Thus, the plunger 382 is associated with both of the input and output portions of the vacuum pump 374, so that the vacuum pump 374 has a simpler construction and a smaller size, than a vacuum pump of a type wherein two members are associated with the input and output portions.

The pressure increasing device 370 further includes a cut-off valve 420 which is connected to the rear pressurizing chamber 50 and the reservoir 50, so as to by-pass the vacuum pump 374 when the cut-off valve 420 is open. The cut-off valve 420 is a normally open solenoid operated shut-off valve which has a solenoid coil 422.

The cut-off valve 420 and the three-way valve 391 are controlled by an electronic control device (ECU) 430, as indicated in FIG. 26. This ECU 430 is basically identical with the ECU 200 provided in the first embodiment.

The ROM of a computer of the ECU 430 stores programs for executing a braking effect characteristic control routine and an anti-lock pressure control routine. The braking effect characteristic control routine in this sixth embodiment includes steps identical with steps S1 and S2 of FIG. 5 of the first embodiment, and steps which correspond to steps S3 and S4 of FIG. 5 but are different from these steps. Namely, the pressure increase control sub-routine and the terminating sub-routine in this sixth embodiment are illustrated in the flow charts of FIGS. 27 and 28, respectively. The anti-lock pressure control routine in the sixth embodiment is identical with that in the first embodiment.

Figure 27:
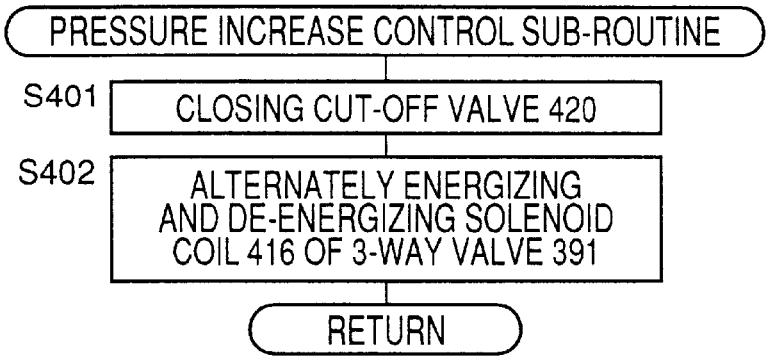
FIG. 27 is a flow chart illustrating a pressure increase control sub-routine executed by a computer of an electronic control unit shown in FIG. 26.

The pressure increase control sub-routine of FIG. 27 is initiated with step S401 to energize the solenoid coil 422 of the cut-off valve 420, for thereby closing the normally open cut-off valve 420. As a result, the fluid in the rear pressurizing chamber 50 can be increased by operation of the vacuum pump 374. Then, the control flow goes to step S402 to alternately energize and de-energize the solenoid coil 416 of the three-way valve 391 to effect a pumping operation of the vacuum pump 374 for thereby increasing the fluid pressure in the rear pressurizing chamber 50. Thus, one cycle of execution of the pressure increase sub-routine of FIG. 27 is terminated.

Figure 28:
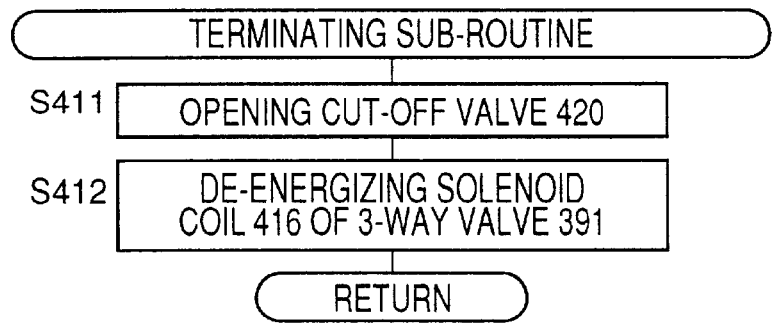
FIG. 28 is a flow chart illustrating a terminating sub-routine executed by the computer of the electronic control unit shown in FIG. 26.

The terminating sub-routine of FIG. 28 is initiated with step S411 to de-energize the solenoid coil 422 of the cut-off valve 420, for restoring the cut-off valve 420 to its original open position. As a result, the fluid flows in the opposite directions between the rear pressurizing chamber 50 and the reservoir 58 are permitted. Then, the control flow goes to step S412 to de-energize the solenoid coil 416 of the three-way valve 391, for holding the valve 391 in the first state, so that the fluid pressure increase in the rear pressurizing chamber 50 is terminated. Thus, one cycle of execution of the sub-routine of FIG. 28 is terminated.

Figure 29:
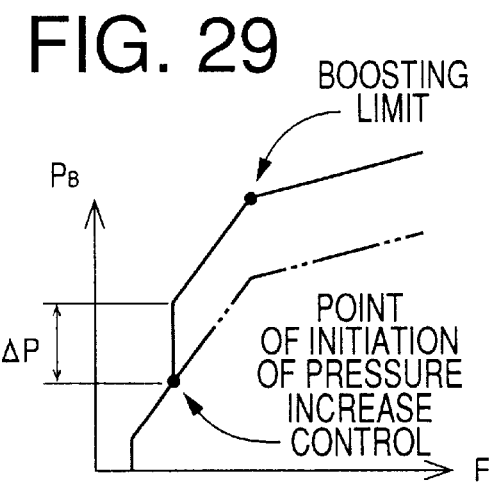
FIG. 29 is a graph for explaining a pressure increase control according to the sub-routine of FIG. 27.

The graph of FIG. 29 shows an increase in the wheel brake cylinder pressure $P_B$ by a pumping operation of the vacuum pump 374. The present sixth embodiment is adapted to initiate the pressure increase control sub-routine of FIG. 27 when the predetermined pressure-increase initiating condition for initiating the pressure increase control has been satisfied, that is, when the detected brake operating force F has been increased to the predetermined threshold $F_{TH}$. As a result, the wheel brake cylinder pressure $P_B$ is increased by the predetermined constant amount $\Delta P$, and the deceleration value G of the vehicle is increased by an amount corresponding to the predetermined amount $\Delta P$ of increase of the wheel brake cylinder pressure $P_B$ by the pressure increase control effected by the vacuum pump 374. Accordingly, the braking effect provided by the braking system is increased, with an increase in the vehicle deceleration value G at the moment when the boosting limit of the booster 12 has been reached, so that the apparent boosting capacity of the booster 12 is accordingly increased.

Figure 30:
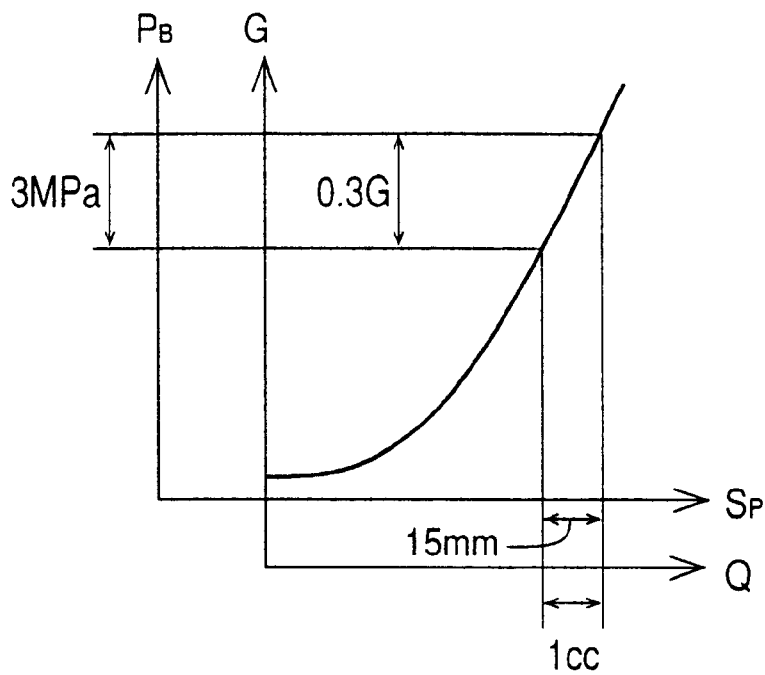
FIG. 30 is a graph for explaining a manner of determining a specification of the braking system.

The graph of FIG. 30 shows an example of specification requirements that must be satisfied upon designing of the braking system. More particularly, the graph indicates a relationship between the operating stroke $S_P$ of the brake pedal 10 and the deceleration value G of the vehicle. In this specific example, the operating stroke $S_P$ of the brake pedal 10 is increased by 15 mm after the predetermined pressure-increase initiating condition for initiating the pressure increase control is satisfied, namely, after the brake operating force F has reached the threshold $F_{TH}$. As a result, the deceleration value G of the vehicle is increased by 0.4G. The graph also indicates that the additional operating stroke of 15 mm of the brake pedal 10 results in an increase of the volume Q of the rear pressurizing chamber 50 by 1 cc, and that the increase of the vehicle deceleration value G by 0.3G corresponds to an increase of the wheel brake cylinder pressure $P_B$ by 3 MPa.

Assuming that a ratio of the surface area of the first pressurizing piston 32 which receives the fluid pressure in the rear pressurizing chamber 50 to the surface area of each of the first and second pressurizing pistons 32, 34 which receives the fluid pressure in the corresponding front pressurizing chamber 36, 38 is 0.6, the amount of increase ΔP of the fluid pressure in the rear pressurizing chamber 50 must be 5 MPa so that the amount of increase ΔP of the wheel brake cylinder pressure $P_B$ is 3 MPa. Assuming that the plunger 382 and the diaphragm 396 of the vacuum pump 374 have respective diameters of 7 mm and 70 mm, the fluid pressure in the rear pressurizing chamber 50 can be increased by 5 MPa by the vacuum pump 374 when the negative pressure of the negative pressure source (intake manifold of the vehicle engine) is about 400 mmHg. For the pump chamber 384 of the vacuum pump 374 to deliver the pressurized fluid into the rear pressurizing chamber 50 so as to increase the volume G of the chamber 50 by 1 cc, the plunger 382 must be advanced by a distance of 26 mm. In this case, the required minimum overall diameter and axial dimension of the vacuum pump 374 are about 80 mm and about 70 mm, respectively.

Figure 31:
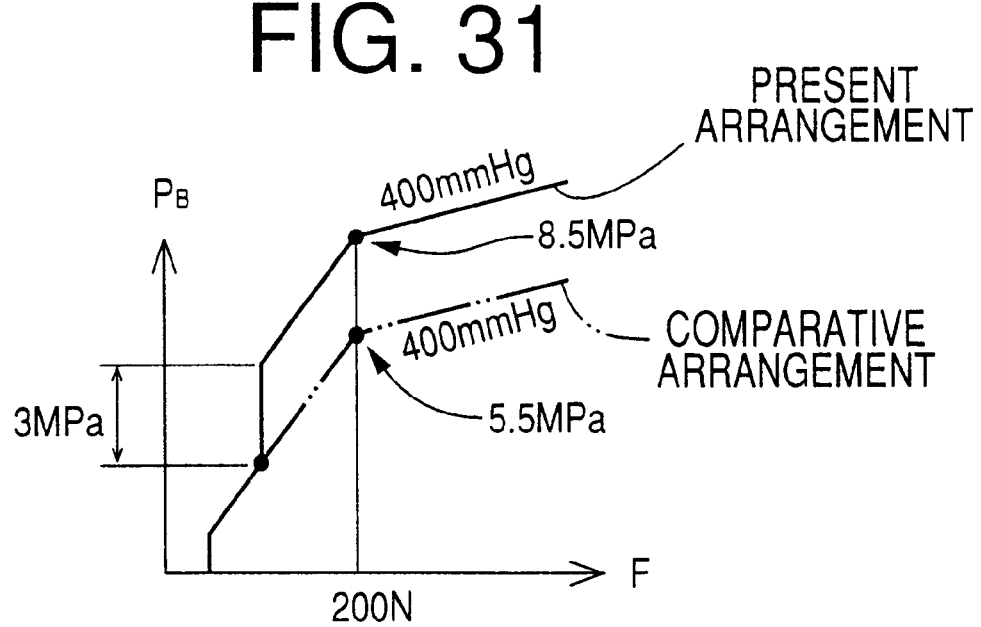
FIG. 31 is a graph for explaining an operation of the braking system designed to meet the specification shown in FIG. 30.

The graph of FIG. 31 shows a relationship between the brake operating force F and the wheel brake cylinder pressure $P_B$ of the present embodiment as compared with that of a comparative or conventional arrangement which does not include a braking effect characteristic control device including the pressure increasing device 370, where the cylindrical portion of the housing of the booster 12 in which the variable-pressure chamber and the negative pressure chamber has an outside diameter of 8 inches and an axial dimension of 80 mm. The conventional arrangement, which is not equipped with the pressure increasing device 370, is arranged to depend upon only the booster 12 to boost the brake operating force F. For the conventional arrangement to be able to have the same wheel brake cylinder pressure $P_B$ at the boosting limit of the booster 12 as that of the present arrangement equipped with the pressure increasing device 370, the above-indicated cylindrical portion of the booster 12 must have an outside diameter of 10 inches and an axial dimension of 80 mm. In this respect, it is noted that a sum of the volumes of the booster 12 and the vacuum pump 370 of the present arrangement is smaller than the volume of the booster 12 of the conventional arrangement which has the same wheel brake cylinder pressure $P_B$ at the boosting limit as the present arrangement. This means that the braking system according to the present embodiment requires a smaller space for installation on an automotive vehicle, than the conventional braking system having the comparative arrangement.

In the present embodiment, the apparent boosting capacity of the booster 12 (wheel brake cylinder pressure at the boosting limit of the booster 12) is increased by the pressure increasing device 370 which is separate from the booster 12, while the overall size of the braking system is reduced. Further, the present braking system has another advantage that the brake operating force F can be boosted by the pressure increasing device 370 even in the event of a failure of the booster 12, so that the operating reliability of the braking system is improved.

Although the present embodiment is adapted to increase the wheel brake cylinder pressure $P_B$ by the predetermined constant amount ΔP by execution of the braking effect characteristic control by the pressure increasing device 370, the pressure increase amount ΔP may be changed as in the first embodiment. To change the pressure increase amount ΔP, the duty ratio of the solenoid coil 416 of the three-way valve 391 may be changed in step S402. Alternatively, the duty ratio of the solenoid coil 422 of the cut-off valve 420 is changed in step S401 while the solenoid coil 416 of the three-way valve 391 is alternately energized and de-energized in step S4022.

Another alternative method of changing the pressure increase amount ΔP is based on a fact that the amount of increase ΔP of the fluid pressure in the rear pressurizing chamber 50 can be estimated from the amount of the fluid delivered from the pump chamber 384 into the rear pressurizing chamber 50 by one reciprocation of the plunger 382. That is, the increase amount of the wheel brake cylinder pressure $P_B$ can be changed by controlling the number of reciprocation of the plunger 382 during the pressure increase control sub-routine of FIG. 37.

While the presently preferred embodiments of the present invention have been described in detail by reference to the accompanying drawings, for illustrative purpose only, it is to be understood that the present invention may be embodied with various changes, modifications or improvements such as those previously described in the SUMMARY OF THE INVENTION, which may occur to those skilled in the art.

What is claimed is:

1. A braking system for an automotive vehicle having a wheel, comprising:

a booster for boosting an operating force acting on a brake operating member;

a master cylinder having a housing and including a pressurizing piston which is substantially fluid-tightly and slidably received in said housing and which cooperates with said housing to define a front pressurizing chamber and a rear pressurizing chamber on front and rear sides thereof, said pressurizing piston receiving at a rear end thereof an output force of said booster, a working fluid in said front pressurizing chamber being pressurized by an advancing movement of said pressurizing piston;

a fluid passage connected to said front pressurizing chamber of said master cylinder;

a brake including a wheel brake cylinder which is connected to said front pressurizing chamber through said fluid passage and which is activated by the fluid pressurized in said front pressurizing chamber, for braking said wheel; and a pressure increasing device activated when a predetermined pressure-increase initiating condition for initiating a pressure increase control is satisfied, to pressurize a fluid in said rear pressurizing chamber, for increasing a pressure of the fluid in said wheel brake cylinder to a value higher than a value before said predetermined pressure-increase initiating condition is satisfied, and wherein said predetermined pressure-increase initiating condition is a predetermined operating condition of said booster in which a braking effect to be provided by said wheel brake cylinder is reduced as compared with a braking effect to be provided when said predetermined operating condition of said booster is not satisfied, and said pressure increasing device is activated, upon detection of said predetermined operating condition, to pressurized the fluid in said rear pressurizing chamber of said master cylinder, so as to at least reduce an amount of reduction of said braking effect.

2. A braking system according to claim 1, wherein said booster is a vacuum booster operated by a negative pressure source, and said predetermined pressure-increase initiating condition is a condition that a boosting limit of said vacuum booster has been reached, said pressure increasing device being activated when said boosting limit has been reached, for at least reducing an amount of reduction of a rate of increase of said braking effect after said boosting limit has been reached.

3. A braking system according to claim 2, wherein a pressure of said negative pressure source has a tendency of variation, and the operating force acting on said brake operating member when said boosting limit of said vacuum booster has been reached varies with the pressure of said negative pressure source, said predetermined pressure-increase initiating condition being a condition that said operating force acting on said brake operating member has increased to a boosting-limit brake operating force which is a value of said operating force to be detected when said boosting limit of said vacuum booster has been reached where an actual value of the pressure of said negative pressure source is equal to an upper limit of a variation range in which said actual value is expected to vary, said upper limit being a negative pressure value nearest to the atmospheric pressure.

4. A braking system according to claim 1, wherein said master cylinder includes a second pressurizing piston in addition to said pressurizing piston which serves as a first pressurizing piston, said first and second pressurizing pistons being disposed in series with each other in said housing such that said first pressurizing piston cooperates with said housing to define said front pressurizing chamber as a first front pressurizing chamber while said second pressurizing piston cooperates with said housing to define a second front pressurizing chamber.

5. A braking system according to claim 1, wherein said pressure increasing device comprises (a) a physical quantity sensor for detecting a physical quantity which relates to said operating force acting on said brake operating member, (b) a pressure generating device electrically operated to pressurized the fluid in said rear pressurizing chamber; and (c) a controller for determining a desired value of the fluid pressure to be established in said rear pressurizing chamber, on the basis of said physical quantity detected by said sensor, and according to a predetermined relationship between said physical quantity and said desired value, said controller controlling said pressure generating device such that the fluid pressure in said rear pressurizing chamber is controlled to said desired value.

6. A braking system according to claim 5, wherein said rear pressurizing chamber is filled with a working liquid as said working fluid, and said pressure increasing device further comprises a flow control device having a non-operated state in which said flow control device permits flows of the working liquid into and from said rear pressurizing chamber, and an operated state in which said flow control device inhibits at least a flow of the working liquid from said rear pressurizing chamber.

7. A braking system according to claim 1, wherein said pressure increasing device includes a hydraulic pump whose output is connected to said rear pressurizing chamber, for pressurizing the fluid in said rear pressurizing chamber.

8. A braking system according to claim 1, wherein said pressure increasing device includes a hydraulic pump whose output is transmitted to said rear pressurizing chamber, without using an accumulator, for pressurizing the fluid in said rear pressurizing chamber.

9. A braking system according to claim 8, wherein said front pressurizing chamber of said master cylinder and said wheel brake cylinder are connected to each other such that said front pressurizing chamber and said wheel brake cylinder are not held disconnected from each other during an operation of said hydraulic pump.

10. A braking system according to claim 9, wherein said fluid passage is provided with a pressure control valve for controlling the fluid pressure in said wheel brake cylinder, said front pressurizing chamber of said master cylinder being connected to said pressure control valve without a cut-off valve being interposed therebetween.

11. A braking system according to claim 5, wherein said rear pressurizing chamber is filled with a working liquid as said working fluid, and said pressure increasing device further comprises (a) a reservoir storing the working liquid, (b) a by-pass passage which by-passes said pressure generating device and which is connected at one of opposite ends thereof to said rear pressurizing chamber and at the other end to said reservoir, and (c) a check valve provided in said by-pass passage and which permits a flow of the liquid in a first direction from said reservoir toward said rear pressurizing chamber, and inhibits a flow of the liquid in a second direction opposite to said first direction.

* * * * *